US012761047B2

(12) United States Patent
Schaefer

(10) Patent No.: US 12,761,047 B2
(45) Date of Patent: Oct. 13, 2026

(54) SYSTEM AND METHOD FOR GENERATING THREE-DIMENSIONAL MESHES OF ROADS AND ROAD GRAPHS

(71) Applicant: Toyota Jidosha Kabushiki Kaisha, Toyota (JP)

(72) Inventor: Alexander C. Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 3 days.

(21) Appl. No.: 18/808,412

(22) Filed: Aug. 19, 2024

(65) Prior Publication Data

US 2026/0049841 A1 Feb. 19, 2026

(51) Int. Cl.
*G01C 21/00* (2006.01)

(52) U.S. Cl.
CPC ..... *G01C 21/3867* (2020.08); *G01C 21/3819* (2020.08)

(58) Field of Classification Search
CPC ........................ G01C 21/3867; G01C 21/3819
See application file for complete search history.

(56) References Cited

U.S. PATENT DOCUMENTS 11,428,536 B2 8/2022 Miller et al.
11,691,648 B2 7/2023 Theverapperuma et al.
11,853,070 B2 * 12/2023 Montemerlo ...... G01C 21/3446
2013/0328863 A1 * 12/2013 Pirwani ............. G01C 21/3822 345/441
2018/0188743 A1 * 7/2018 Wheeler ................ G01C 21/30
2022/0196839 A1 * 6/2022 Goldstein ............... G06T 17/20
2023/0195122 A1 6/2023 Shenfeld et al.
2025/0297866 A1 * 9/2025 Jeong ................. G01C 21/3878

FOREIGN PATENT DOCUMENTS

EP 4230960 A2 * 8/2023 ............. G01C 21/32
JP 2022542712 A 10/2022

OTHER PUBLICATIONS

Lewandowicz, E., & Flisek, P. (2020). A Method for Generating the Centerline of an Elongated Polygon on the Example of a Watercourse. ISPRS International Journal of Geo-Information, 9(5), 304. https://doi.org/10.3390/ijgi9050304 (Year: 2020).*

(Continued)

*Primary Examiner* — Christian Chace
*Assistant Examiner* — Minato Lee Horner
(74) *Attorney, Agent, or Firm* — Christopher G. Darrow; Darrow Mustafa PC

(57) ABSTRACT

Systems and methods for generating three-dimensional meshes that represent road surfaces of a road network are disclosed herein. In one example, a system includes a processor and a memory having instructions that, when executed by the processor, cause the processor to generate a three-dimensional mesh representing road surfaces of a road network using a connection graph, a separation graph, and drivable surface polygons representing drivable surfaces of the road and generate a road graph for an electronic map based on the three-dimensional mesh, wherein the road graph is a digital representation of a topology of a road network.

15 Claims, 15 Drawing Sheets

(56) References Cited

OTHER PUBLICATIONS

Ni, Z., Xie, L., Xie, T., Shi, B., & Zheng, Y. (2018). Incremental Road Network Generation Based on Vehicle Trajectories. ISPRS International Journal of Geo-Information, 7(10), 382. https://doi.org/10.3390/ijgi7100382 (Year: 2018).*

Zhou, et al., "Automatic Construction of Lane-level HD Maps for Urban Scenes," IEEE/RSJ International Conference on Intelligent Robots and Systems, 2021, 9 pages.

Sunando Sengupta, "Semantic Mapping of Road Scenes," Oxford Brookes University, 2014, 138 pages.

Sontges, et al., "Computing the Drivable Area of Autonomous Road Vehicles in Dynamic Road Scenes," IEEE Transactions on Intelligent Transportation Systems, 2017,12 pages.

Hortelano, et al., "Recent Developments on Drivable Area Estimation: A Survey and a Functional Analysis," Sensors, 2023, 23 pages.

Wedel, et al., "B-Spline Modeling of Road Surfaces With an Application to Free-Space Estimation," IEEE transactions on Intelligent transportation systems, 2009, 12 pages.

* cited by examiner

SYSTEM AND METHOD FOR GENERATING THREE-DIMENSIONAL MESHES OF ROADS AND ROAD GRAPHS

TECHNICAL FIELD

The subject matter described herein relates, in general, to systems and methods for generating three-dimensional meshes of roads and road graphs.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Road graphs are a digital representation of the topology of a road network. Moreover, a road graph may include nodes representing intersections/interruptions and edges representing roads that connect the nodes. Generally, road graphs are generated utilizing vehicle sensor information and may need to be manually annotated, making the creation of these road graphs computationally complex, laborious, inaccurate, and expensive.

SUMMARY

This section generally summarizes the disclosure and is not a comprehensive explanation of its full scope or all its features.

In one example, a system includes a processor and a memory having instructions that, when executed by the processor, cause the processor to generate a three-dimensional mesh representing road surfaces of a road network using a connection graph, a separation graph, and drivable surface polygons representing drivable surfaces of the road and generate a road graph for an electronic map based on the three-dimensional mesh. The connection graph indicates which overlapping polygons of the drivable surface polygons represent the road surfaces that are directly accessible to each other. Conversely, the separation graph indicates which of the overlapping polygons of the drivable surface polygons represent the road surfaces that are not directly accessible to each other.

In another example, a method includes the steps of generating a three-dimensional mesh representing road surfaces of a road using a connection graph, a separation graph, and drivable surface polygons representing drivable surfaces of the road and generating a road graph for an electronic map based on the three-dimensional mesh. Like before, the connection graph indicates which overlapping polygons of the drivable surface polygons represent the road surfaces that are accessible to each other, while the separation graph indicates which of the overlapping polygons of the drivable surface polygons represent the road surfaces that are not accessible to each other.

In yet another example, a non-transitory computer-readable medium includes instructions that, when executed by a processor, cause the processor to generate a three-dimensional mesh representing road surfaces of a road using a connection graph, a separation graph, and drivable surface polygons representing drivable surfaces of the road and generate a road graph for an electronic map based on the three-dimensional mesh. Again, the connection graph indicates which overlapping polygons of the drivable surface polygons represent the road surfaces that are accessible to each other, while the separation graph indicates which of the overlapping polygons of the drivable surface polygons represent the road surfaces that are not accessible to each other.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for generating three-dimensional meshes of roads, which can then be utilized to generate road graphs for use in electronic maps. Moreover, the systems and methods described herein utilize key point detections of lane boundaries detected from the sensor system of a vehicle. These key point detections are used to create boundary lines of the lane and road boundaries and, along with vehicle trace data, are then utilized to generate drivable surface polygons. These drivable surface polygons represent the drivable surface of a road.

Once the drivable surface polygons are created, the system and method can then create a connection graph and a separation graph. The connection graph essentially indicates which overlapping polygons of the drivable surface polygons represent the road surfaces that are directly accessible to each other, while the separation graph indicates which of the overlapping polygons of the drivable surface polygons represent the road surfaces that are not directly accessible to each other. Using the connection graph and the separation graph, the drivable surface polygons can then be used to generate a three-dimensional mesh of a road network.

After the three-dimensional mesh of the road network is generated, road graphs can be generated by overlaying vehicle traces on the triangles forming the three-dimensional mesh. In situations where vehicle traces cross two sides of a triangle of the three-dimensional mesh, a road graph is plotted between the midpoints of the two sides that were crossed. Once the road graph is generated, the road graph can be incorporated into one or more electronic maps and can be used for a number of different vehicle routing, vehicle navigation, or other functions. As such, the systems and methods described herein can start with key point detections and vehicle trace information and ultimately generate road graphs based on this information by creating a three-dimensional mesh as an intermediate step.

Figure 1:
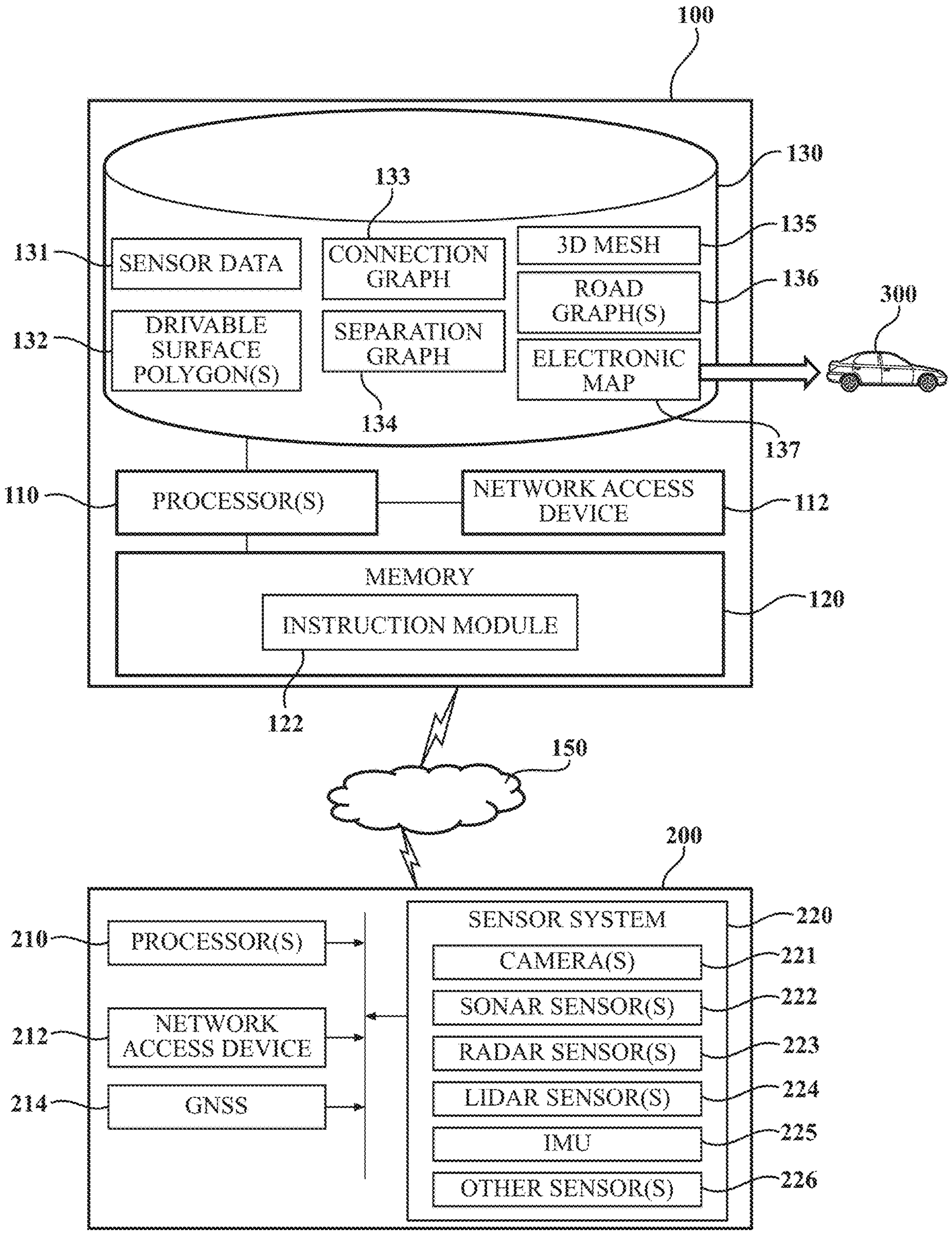
FIG. 1 illustrates a vehicle for collecting road-related information and a system for processing road-related information to generate three-dimensional meshes and road graphs for use in electronic maps.

Before providing a detailed description of how the three-dimensional meshes and road graphs are generated, a brief description of some of the hardware components that may be utilized in the generation of the three-dimensional meshes and road graphs will be given. Moreover, FIG. 1 illustrates one example of a system 100 for generating three-dimensional meshes and road graph(s) 136 using sensor data 131 collected from vehicles, such as the vehicle 200. The system 100 and/or the vehicle 200 also include various elements. It will be understood that in various embodiments, it may not be necessary for the system 100 and/or the vehicle 200 to have all of the elements shown in FIG. 1. The system 100 and/or the vehicle 200 can have any combination of the various elements shown in FIG. 1. Further, the system 100 and/or the vehicle 200 can have additional elements to those shown in FIG. 1. In some arrangements, the system 100 and/or the vehicle 200 may be implemented without one or more of the elements shown in FIG. 1. While the various elements are shown as being located within the system 100 and/or the vehicle 200 in FIG. 1, it will be understood that one or more of these elements can be located external to the system 100 and/or the vehicle 200. Further, the elements shown may be physically separated by large distances and provided as remote services (e.g., cloud-computing services).

As will be explained in greater detail later in this description and mentioned briefly in the paragraphs above, the system 100 utilizes the sensor data 131 to generate drivable surface polygon(s) 132, a connection graph 133, and a separation graph 134. In turn, a three-dimensional mesh 135 of the detected road network can then be generated using the drivable surface polygon(s) 132, the connection graph 133, and the separation graph 134. Once the three-dimensional mesh 135 is generated, road graph(s) 136 can be created, which can be utilized in an electronic map 137.

The electronic map 137, or portions thereof, can then be made available to a vehicle 300 for navigation, routing, etc. For example, the electronic map, or portions thereof, may be stored or otherwise made available to one or more systems of the vehicle 300. For example, a vehicle navigation and/or autonomous driving system (if so equipped) of the vehicle 300 could utilize the electronic map 137 for routing, autonomous driving, etc.

The vehicle 200 can be any form of transport. In one or more implementations, the vehicle 200 is an automobile. While arrangements will be described herein with respect to automobiles, it will be understood that embodiments are not limited to automobiles. In some implementations, the vehicle 200 may be any robotic device or form of powered transport that, for example, includes one or more automated or autonomous systems and thus benefits from the functionality discussed herein.

The vehicle 200 has a sensor system 220 that may include one or more sensors. "Sensor" means any device, component, and/or system that can detect and/or sense something. The one or more sensors can be configured to detect and/or sense in real time. As used herein, the term "real-time" means a level of processing responsiveness that a user or system senses as sufficiently immediate for a particular process or determination to be made or that enables the processor to keep up with some external process. Here, in this example, the sensor system 220 includes camera(s) 221, sonar sensor(s) 222, radar sensor(s) 223, LIDAR sensor(s) 224, an inertial measurement unit 225, and/or other sensor(s) 226.

Essentially, the sensors 221-226, making up the sensor system 220, may have the ability to collect information regarding the boundaries of lanes that the vehicle 200 is traveling upon. The vehicle 200 may also include a global navigation satellite system (GNSS) sensor 214 that may be able to receive information from a satellite constellation to provide positioning, navigation, and timing information to one or more processor(s) 210 of the vehicle 200.

Information from the sensor system 220 and/or other vehicle systems, such as the GNSS sensor 214, may be processed by the processor(s) 210 of the vehicle 200 and provided to the system 100 using a network access device 212 that can package and transmit this information to the system 100 via a network 150. The network 150 may be a wireless network that allows for the transmission of information from the vehicle 200 to the system 100. The network access device 112 of the system 100 may then receive this information from the vehicle 200 and save this information as the sensor data 131. As will be explained, the sensor data 131 includes key point detections of lane boundaries and/or vehicle trace information that indicates the trajectory of the vehicle 200 when collecting data from the sensor system 220.

Returning to the system 100, the system 100 includes one or more processor(s) 110. Accordingly, the processor(s) 110 may be a part of the system 100, or the system 100 may access the processor(s) 110 through a data bus or another communication path. In one or more embodiments, the processor(s) 110 is an application-specific integrated circuit that is configured to implement functions associated with an instruction module 122. In general, the processor(s) 110 is an electronic processor, such as a microprocessor, which is capable of performing various functions as described herein.

In one example, the system 100 includes a memory 120 that stores instruction module 122. The memory 120 may be a random-access memory (RAM), read-only memory (ROM), a hard disk drive, a flash memory, or other suitable memory for storing the instruction module 122. The instruction module 122 is, for example, computer-readable instructions that, when executed by the processor(s) 110 cause the processor(s) 110 to perform the various functions disclosed herein.

Furthermore, in one example, the system 100 includes a data store 130. The data store 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store 130 stores data used by the instruction module 122 in executing various functions. As previously mentioned, the data store 130 can include sensor data 131, drivable surface polygon(s) 132, a connection graph 133, a separation graph 134, three-dimensional mesh 135, road graph(s) 136, and/or an electronic map 137, among other things. It should be understood that this description of what can be stored in the data store 130 is not necessarily complete. As such, the data store 130 may store fewer or more different types of data than that described.

Figure 2A:
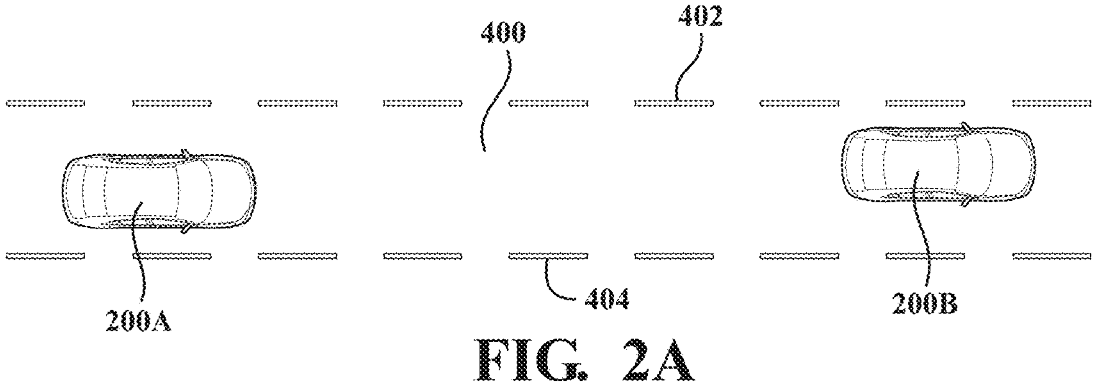
FIGS. 2A-2C illustrate the construction of boundary lines utilizing key point detections generated from sensor information.

As mentioned before, the instruction module 122 contains instructions that cause the processor(s) 110 to perform any of the methodologies described herein. As mentioned before, these can include the steps for generating the three-dimensional mesh and/or road graph(s) for use in electronic maps. At the outset, the instruction module 122 may contain instructions that cause the processor(s) 110 to determine boundary lines using key point detections. Moreover, FIG. 2A illustrates vehicles 200A and 200B that may be similar to the vehicle 200 shown in FIG. 1. As such, the vehicles 200A and 200B may have similar components, such as the sensor system 220, for detecting boundaries 402 and 404 of the lane 400 that the vehicles 200A and 200B are traveling upon. In one example, images collected from one or more camera(s) 221 of the sensor system 220 may be processed by the processor(s) 210 of the vehicles 200A and 200B to generate key point detections and vehicle trace information. Alternatively, raw sensor data, such as images from the camera(s) 221, can be provided directly to the system 100 for processing to generate the key point detections and vehicle trace information.

Figure 2B:
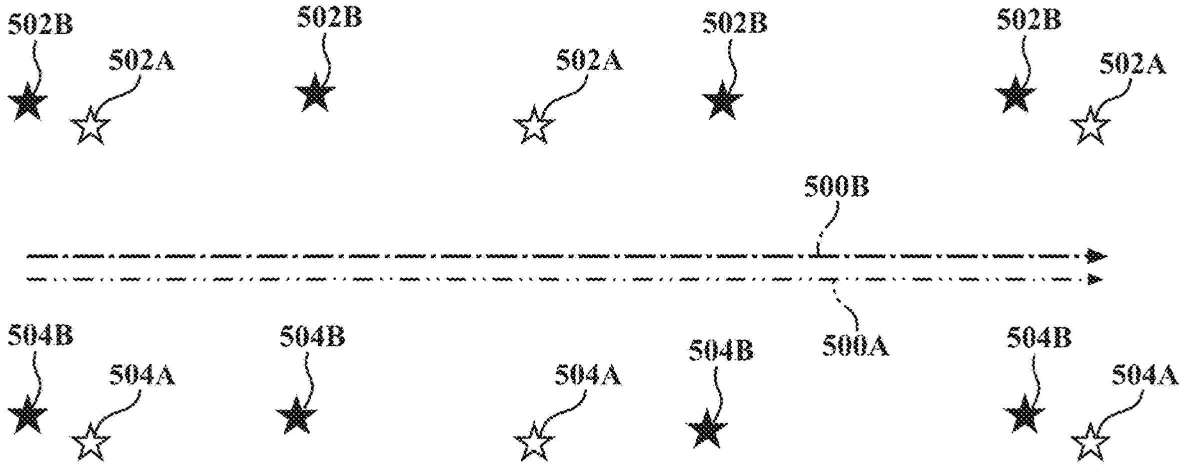

As best shown in FIG. 2B, illustrated are left boundary key point detections 502A and 502B generated by the vehicles 200A and 200B, respectively. Also illustrated are right boundary key point detections 504A and 504B generated by the vehicles 200A and 200B, respectively. In addition, also generated are vehicle traces 500A and 500B of the vehicles 200A and 200B, respectively, illustrating the trajectories of the vehicles 200A and 200B when collecting sensor data used to generate the key point detections 502A, 502B, 504A, and/or 504B. The information regarding the key point detections 502A, 502B, 504A, and/or 504B and the vehicle traces 500A and 500B may be stored in the sensor data 131 of the data store 130. It should be understood that this is just an example and that other methods of detecting boundary lines can be implemented. Further still, while this example illustrates detecting boundary lines of the lane that the vehicles 200A and 200B are traveling on, the vehicles 200A and/or 200B may be able to detect boundary lines of lanes on which they are not traveling.

Figure 2C:
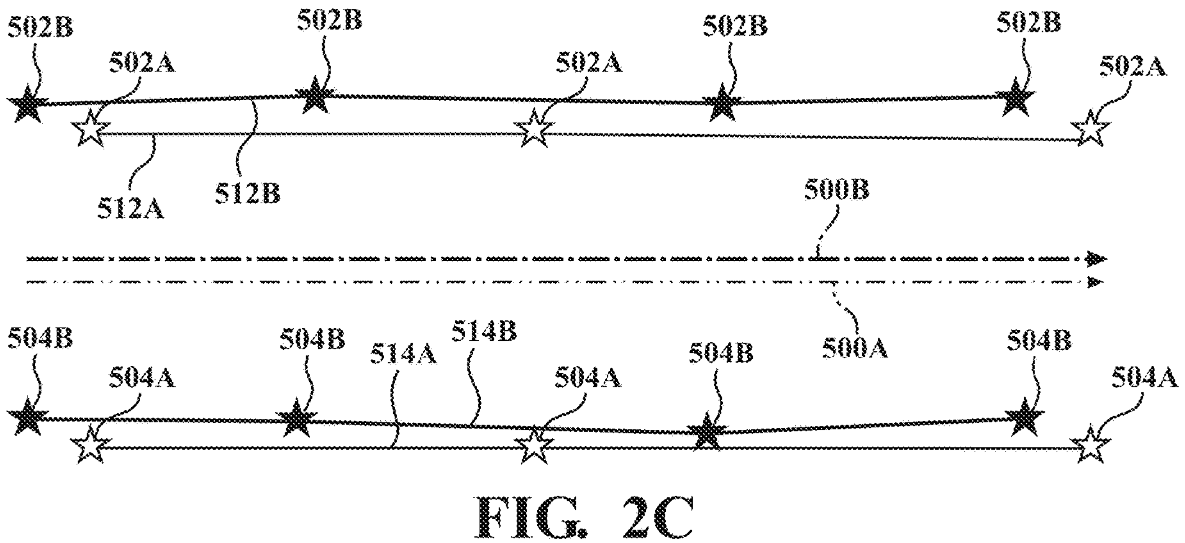

The key point detections 502A, 502B, 504A, and/or 504B can be used to generate boundary lines, such as the boundary lines 512A, 512B, 514A, and 514B shown in FIG. 2C. Moreover, the boundary lines 512A and 512B represent the left boundary 402 of the lane 400 based on the key point detections 502A and 502B of the vehicles 200A and 200B, respectively. Additionally, the boundary lines 514A and 514B represent the right boundary 404 of the lane 400 based on the key point detections 504A and 504B of the vehicles 200A and 200B, respectively. Essentially, the instruction module 122 contains instructions that cause the processor(s) 110 to plot the boundary lines 512A, 512B, 514A, and 514B by connecting the key point detections 502A, 502B, 504A, and 504B, respectively.

As noticeable in FIG. 2C, the boundary lines 512A, 512B, 514A, and 514B do not exactly match up with one another. More simply, the boundary lines 512A and 512B, while representing the same boundary of the same lane, are not precisely located in the same position. Similarly, the boundary lines 514A and 514B are also not precisely located at the same position. Some of these variations can be explained by sensor noise, environmental interference, variations in processing power, sensor type, etc.

Figure 3A:
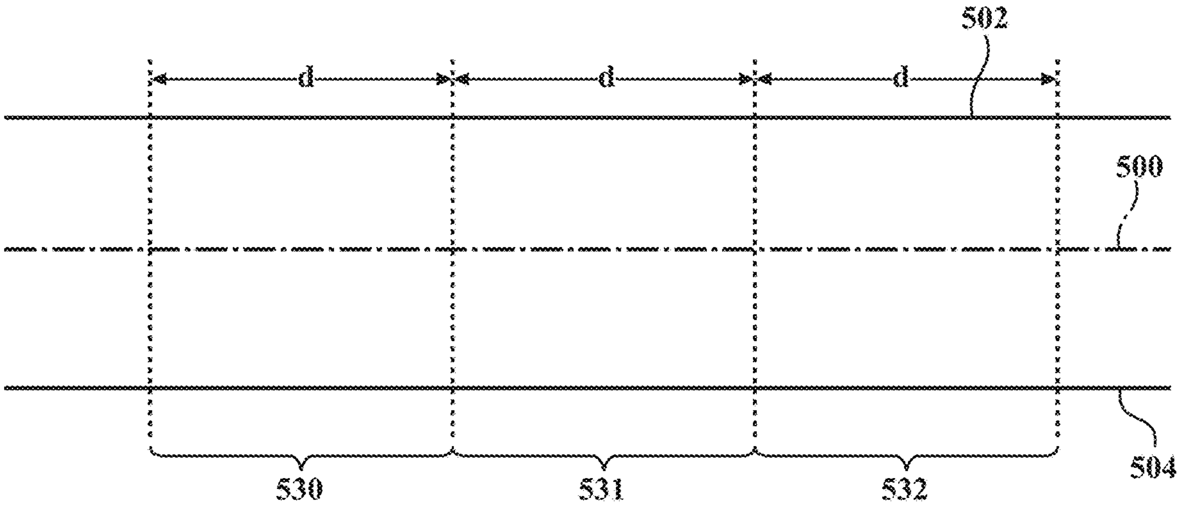
FIGS. 3A and 3B illustrate the construction of drivable surface polygons utilizing boundary lines and vehicle traces.
Figure 3B:
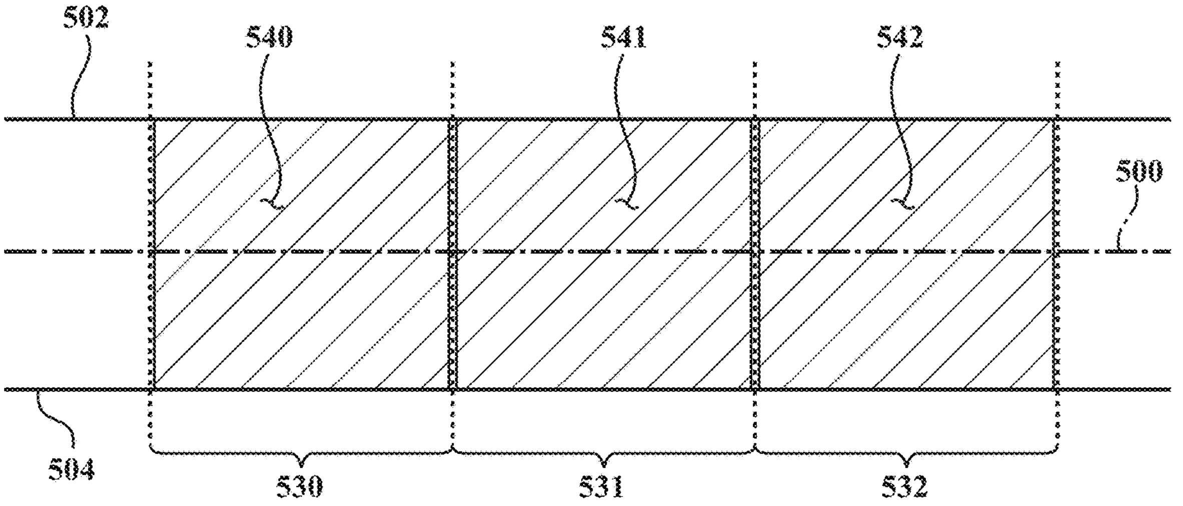

Once the boundary lines 512A, 512B, 514A, and 514B have been generated, the instruction module 122 contains instructions that cause the processor(s) 110 to generate drivable surface polygons using the boundary lines and the vehicle traces. Moreover, in this example, one may assume that a drivable surface can be modeled as the hull of the boundary lines. More simply, the assumption is that the vehicle that generated the boundary lines should be located on a drivable surface and that the area between the vehicle and the key boundary lines is drivable. Referring to FIGS. 3A and 3B, illustrated is a simplified example of a vehicle trace 500 and boundary lines 502 and 504. Here, the instruction module 122 contains instructions that cause the processor(s) 110 to segment the vehicle trace 500 into multiple segments 530-532. Generally, the vehicle trace 500 may be segmented by a fixed distance d. In one example, the fixed distance d may be approximately 100 meters, but any suitable distance can be utilized. Additionally, it should be understood that the segmenting may not be by a fixed distance but by a variable distance.

After that, the instruction module 122 contains instructions that cause the processor(s) 110 to generate drivable surface polygons 540-542 having a length dictated by the fixed distance d and a width generally extending between the boundary lines 502 and 504. In situations wherein a vehicle detects multiple boundary lines to one side of the detection vehicle, the outermost boundary line may be utilized. Essentially, projections are made from the segments 530-532 to the boundary lines 502 and 504 to form each of the drivable surface polygons 540-542. These drivable surface polygons 540-542 may be stored in the data store 130 as the drivable surface polygon(s) 132.

Figure 4A:
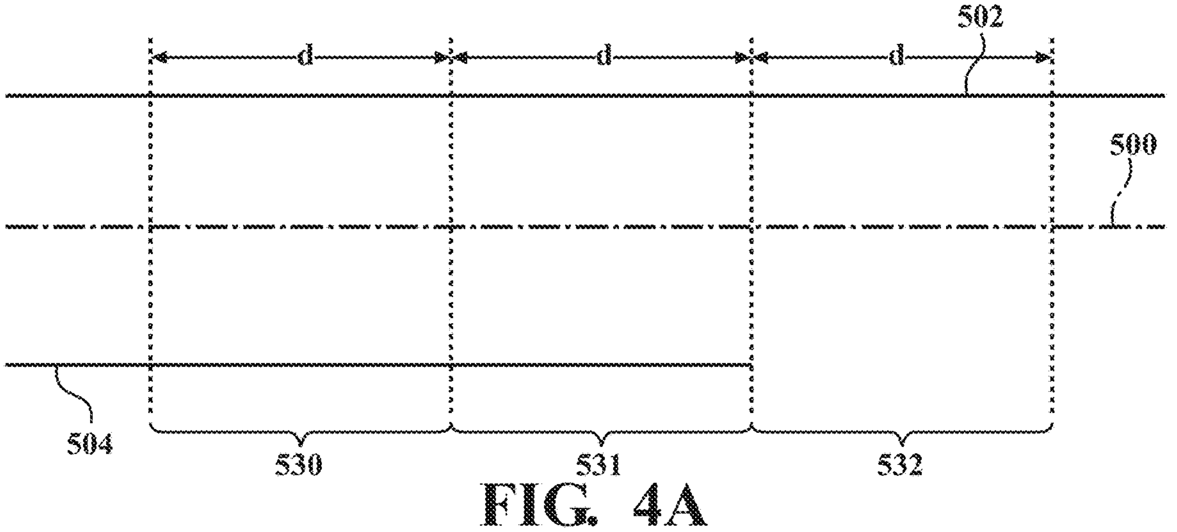
FIGS. 4A-4C illustrate the construction of drivable surface polygons in situations where there are no boundary lines detected on one or both sides of the vehicle.

There may be certain situations wherein portions of the projections of boundary lines 502 and/or 504 onto the vehicle trace 500 do not overlap. For example, FIG. 4A illustrates a situation where the boundary line 504 does not overlap with a portion of the boundary line 502. More specifically, the segment 532 can be projected towards the boundary line 502 but cannot be projected towards the boundary line 504, as that portion does not overlap the boundary line 502. When this situation is detected, the instruction module 122 may contain instructions that cause the processor(s) 110 to still generate a drivable surface polygon involving the segment 533.

Figure 4B:
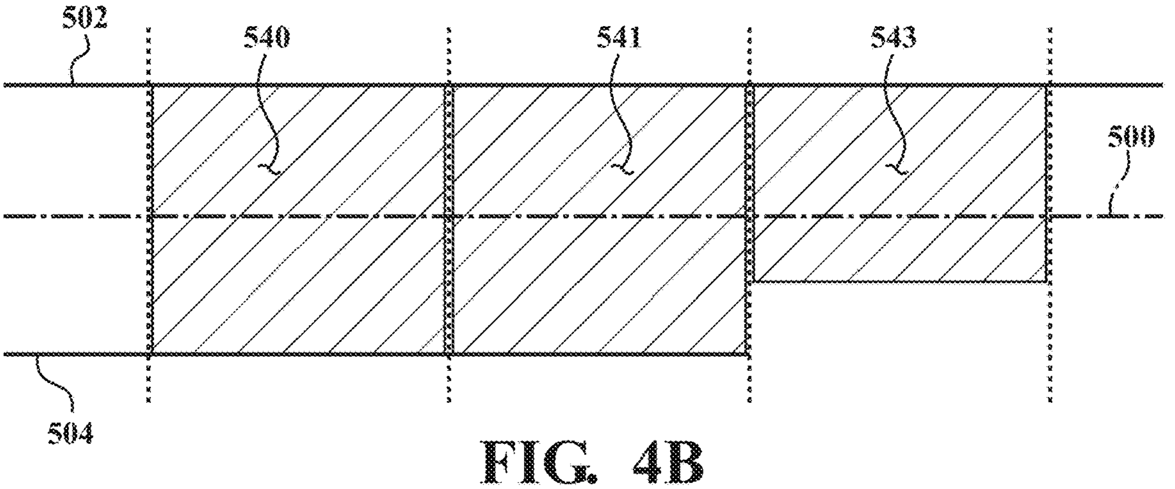

In one example, best shown in FIG. 4B, the instruction module 122 contains instructions that cause the processor(s) 110 to determine a drivable surface polygon 543. In this example, the drivable surface polygon 543 extends from the vehicle trace 500 to the boundary line 502. Additionally, the drivable surface polygon 543 also extends from the vehicle trace 500 in a direction away from the boundary line 502 for a distance that is roughly half the width of the vehicle that generated the vehicle trace 500. Essentially, it is assumed that if the vehicle were able to generate the vehicle trace 500, it would logically need to occupy some space (roughly half the width of the vehicle) in the direction where no boundary line was detected. This space is assumed to be drivable because the vehicle drove over it.

Figure 4C:
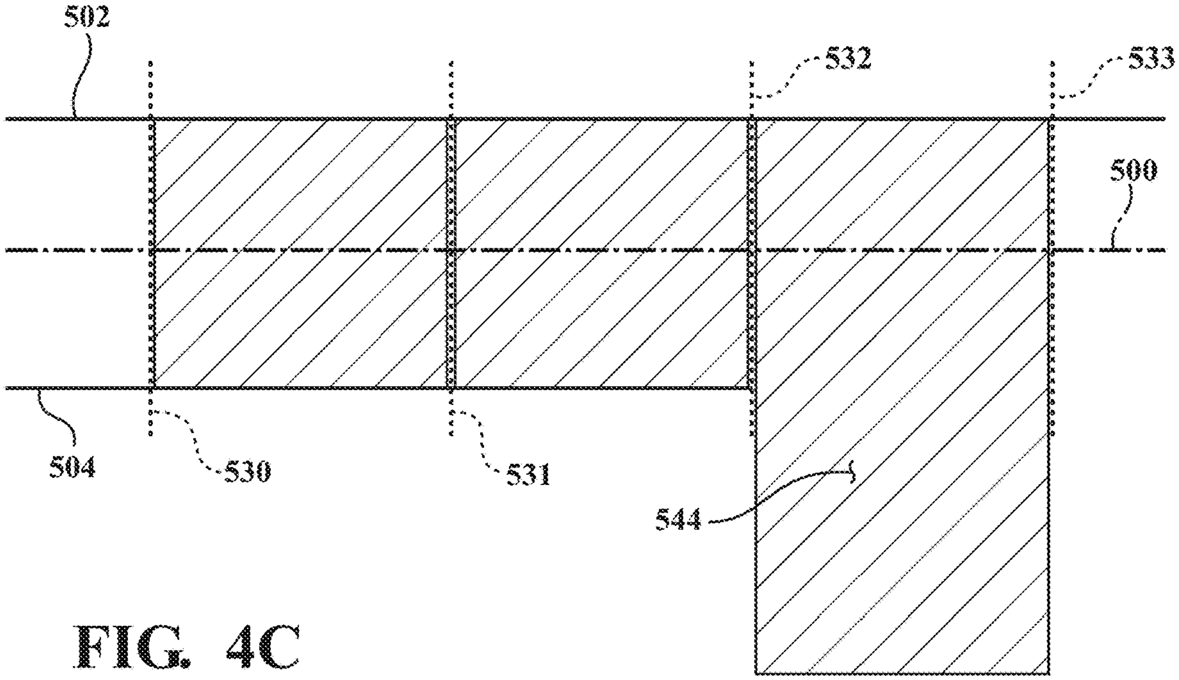

In another example, best shown in FIG. 4C, the instruction module 122 contains instructions that cause the processor(s) 110 to determine a drivable surface polygon 544. Here, like in the previous example, the drivable surface polygon 544 extends from the vehicle trace 500 to the boundary line 502. In addition, the drivable surface polygon 544 extends in the opposite direction away from the vehicle trace 500 for a distance that is roughly equivalent to the maximum sensing range of the sensor(s) of the vehicle. Here, there is an assumption that the vehicle sensors did not detect the lane boundary because it was outside of the maximum sensing range of the sensors used to detect that specific lane boundary.

It should be understood that the examples given in FIGS. 4A-4C for situations where there is not a corresponding or overlapping lane boundary are merely just a few methodologies that may be utilized to generate drivable surface polygons. These methodologies also apply if the vehicle does not detect any boundary line at all.

Figure 5:
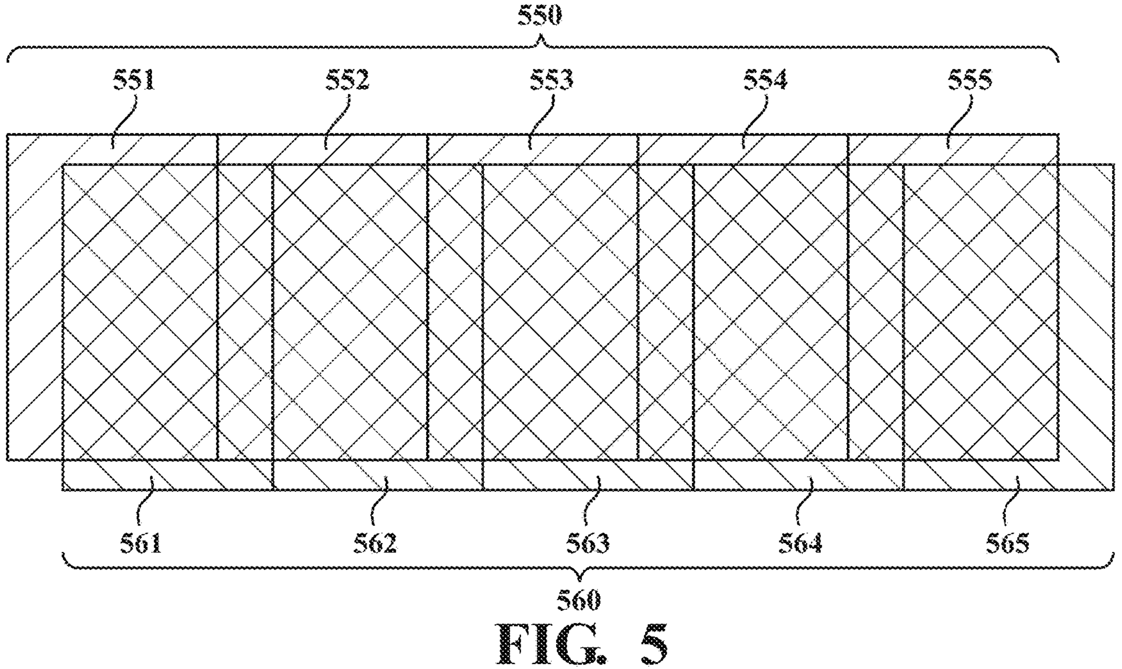
FIG. 5 illustrates a simplified example of overlapping drivable surface polygons.
Figure 6:
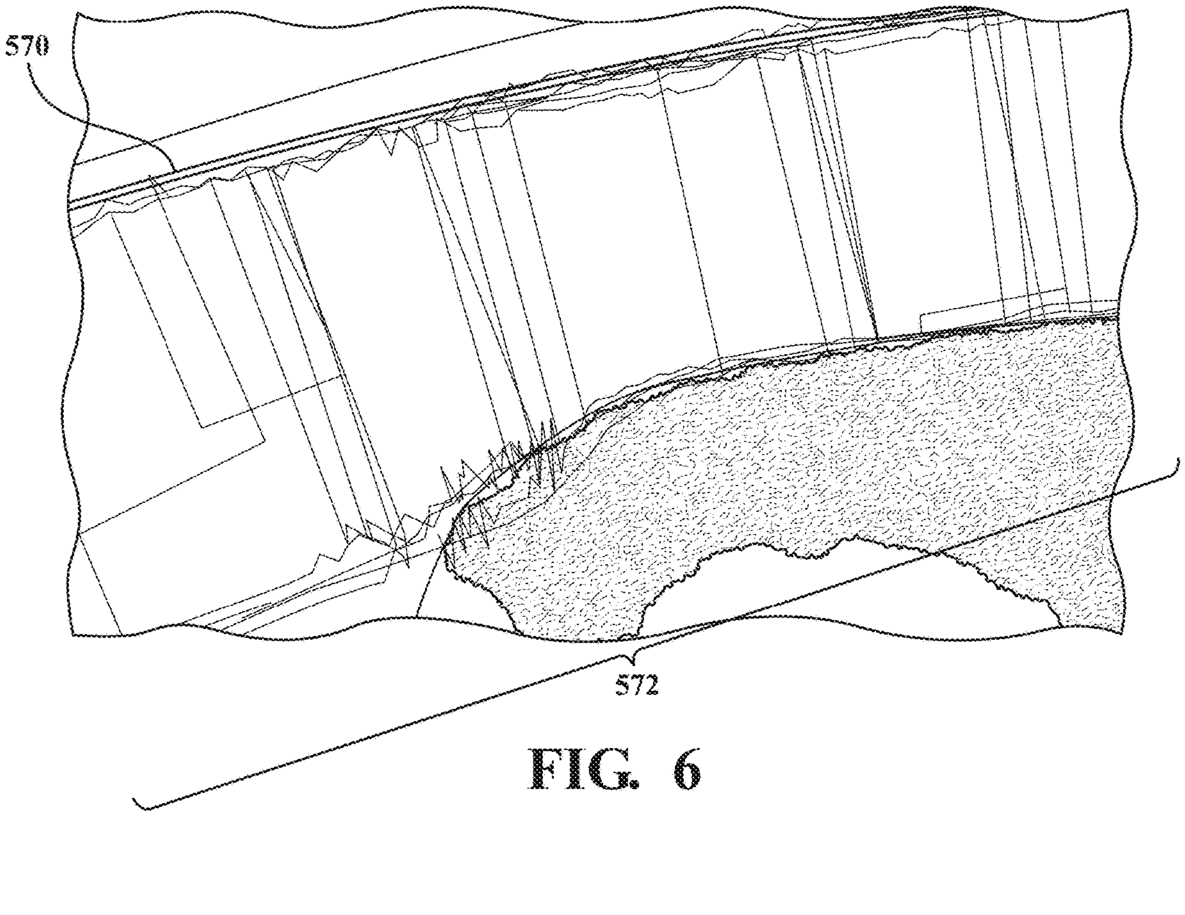
FIG. 6 illustrates a more complex example of overlapping drivable surface polygons.

As such, the generation of the drivable surface polygons based on sensor information from multiple vehicles or even multiple passes by the same vehicle yields overlapping polygons. For example, FIG. 5 illustrates a simplified example wherein one set 550 of drivable surface polygons 551-554 overlaps another set 560 of drivable surface polygons 561-565. FIG. 6 illustrates a real-life example of a roadway 570 and corresponding drivable surface polygons 572 that generally overlap one another.

Before going further, it is worth noting that the drivable surface polygons, such as the drivable surface polygons 572, can be used by themselves to generate information that can be utilized in electronic maps. For example, the instruction module 122 could contain instructions that cause the processor(s) 110 to compute a union of multiple drivable surface polygons to generate a coherent drivable surface polygon for use with an electronic map.

Figure 7:
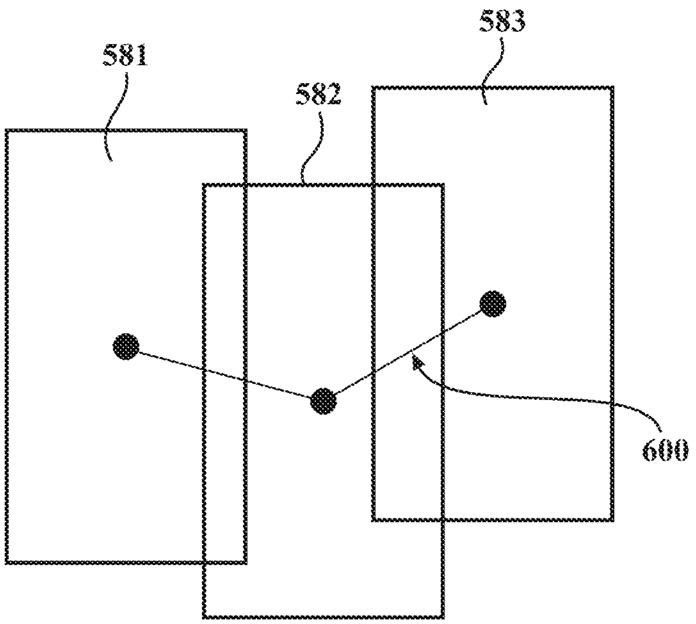
FIG. 7 illustrates a connection graph that is used to construct a three-dimensional mesh of a road network.
Figure 8:
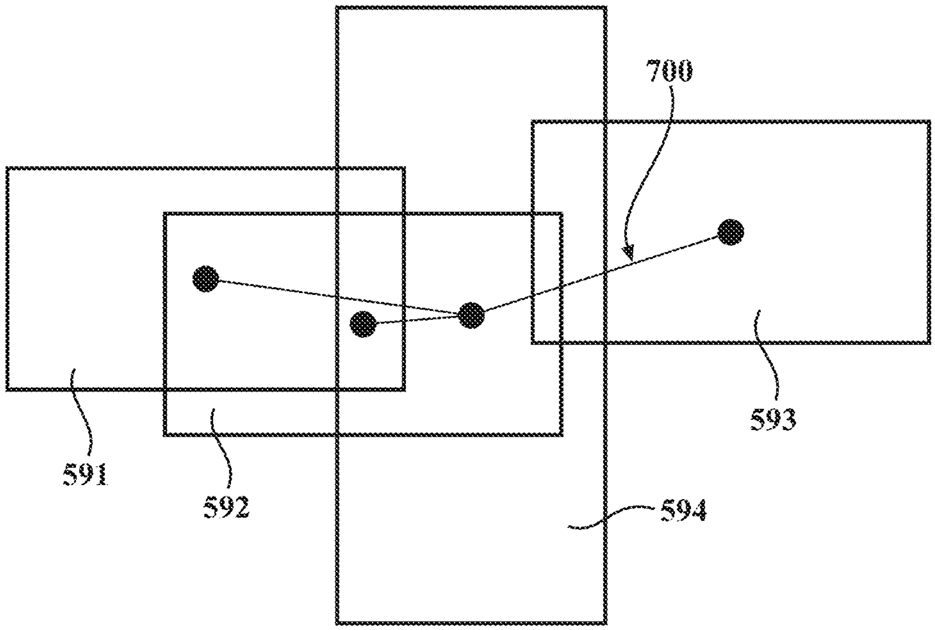
FIG. 8 illustrates a separation graph that is used to construct a three-dimensional mesh of a road network.

As best shown in FIGS. 7 and 8, once the drivable surface polygons have been generated, the instruction module 122 contains instructions that cause the processor(s) 110 to generate both a connection graph 600 and a separation graph 700, which may be stored in the data store 130 as the connection graph 133 and the separation graph 134, respectively.

Moreover, the connection graph 600 is a graph that indicates which overlapping drivable surface polygons are directly accessible to each other—essentially drivable surface polygons that represent road/lane portions that can be drivable from one to another. The separation graph 700 is a graph that indicates which overlapping drivable surface polygons are not directly accessible to each other. For example, a drivable surface polygon representing an overpass that overlaps a drivable surface polygon of an underlying road would not be accessible to one another and would, therefore, be part of the separation graph 700.

With particular reference to FIG. 7, illustrated are overlapping drivable surface polygons 581-583. To determine if they are accessible to one another and should be part of the connection graph 600, the instruction module 122 causes the processor(s) 110 to first determine the drivable surface polygons that overlap with one another. In this example, the drivable surface polygons 581 and 582 overlap each other, and the drivable surface polygons 582 and 583 overlap each other. Upon determining an overlapping pair of drivable surface polygons, the instruction module 122 causes the processor(s) 110 to determine whether or not the drivable surface polygons are directly accessible. This determination can be based on a set of heuristics or a machine learning classification model, for example. In the case of using a set of heuristics, the instruction module 122 could cause the processor(s) to compare the altitudes of the drivable surface polygons. For example, the altitudes of the drivable surface polygons 581 and 582 are compared to one another to determine if they are within a threshold distance from one another. For example, the threshold distance could be approximately 1-2 meters. As such, if the drivable surface polygons 581 and 582 are less than the threshold distance, the instruction module 122 causes the processor(s) 110 to determine that they are accessible to one another and, therefore, be included in the connection graph 600. Similarly, an altitude comparison will be performed between the drivable surface polygon 582 and the drivable surface polygon 583 to determine if they are within the threshold distance. If so, the drivable surface polygon 583 will also be included as part of the connection graph 600.

It should be understood that threshold distance can vary from application to application. As such, the threshold distance of approximately 1-2 meters is merely an example and may change considerably. In addition to an altitude comparison, other additional comparisons may also be made to confirm that the drivable surface polygons 581-583 are accessible to each other and should be included as part of the connection graph 600. For example, if the drivable surface polygons 581-583 were generated from consecutive sensor information from the same vehicle, this is an indicator that the drivable surface polygons 581-583 should be part of the connection graph 600. In another example, the amount of overlap between drivable surface polygons could be compared, wherein the greater the overlap, the greater the likelihood that the drivable surface polygons are accessible to one another and should be included as part of the connection graph 600.

FIG. 8 illustrates one example of a separation graph that indicates situations where overlapping drivable surface polygons are not accessible to one another, such as a bridge being located above another road. In this example, assume the drivable surface polygons 591-593 are for an overpass, while the drivable surface polygon 594 is for a road that is located underneath the overpass. As such, the drivable surface polygon 594 cannot directly access the overlapping drivable surface polygons 591-593. Like before, the instruction module 122 causes the processor(s) 110 to determine overlapping drivable surface polygons. In this case, the processor(s) 110 will detect overlaps between the drivable surface polygons 591 and 592, 591 and 594, 592 and 593, 592 and 593, and 593 and 594.

After that, the instruction module 122 causes the processor(s) 110 to determine the altitude differences between the above drivable surface polygons pairs. Like before, a threshold distance can be utilized to determine if the altitude difference is significant enough to indicate that the drivable surface polygon 594 cannot access the drivable surface polygons 591-593. For example, if the threshold distance is 1 meter and the altitude difference is greater than the threshold distance, the processor(s) 110 will determine that the drivable surface polygon 594 cannot access the drivable surface polygons 591-593. When this occurs, the separation graph 700 is generated, indicating that the drivable surface polygon 594 cannot access the drivable surface polygons 591-593.

Figure 9:
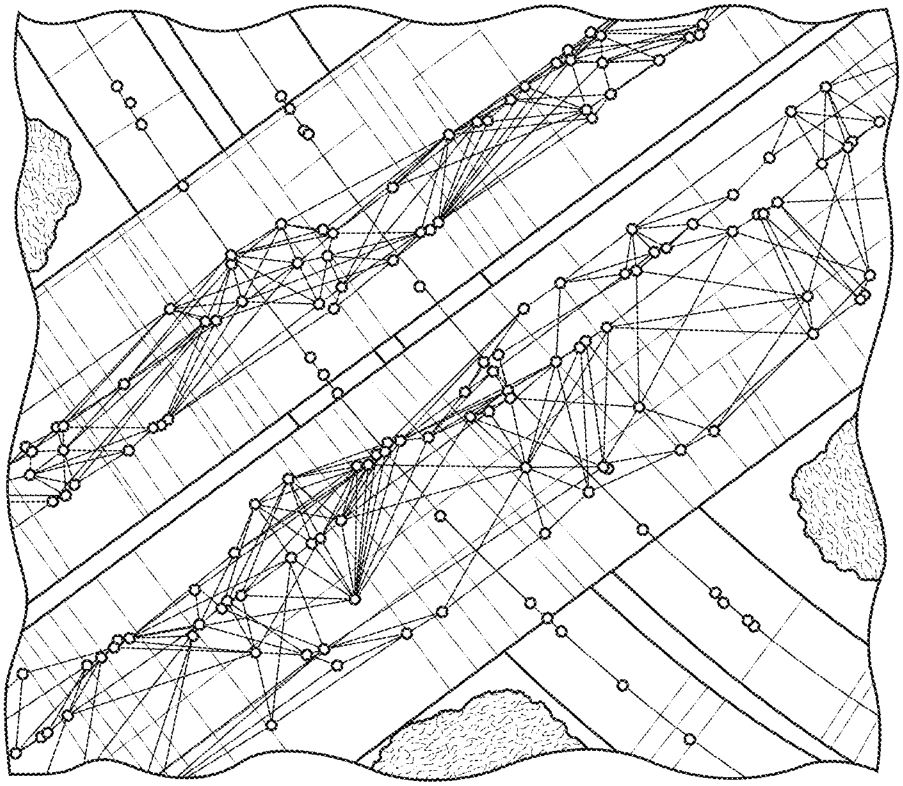
FIG. 9 illustrates a more complex example of the connection graph of FIG. 7.
Figure 10:
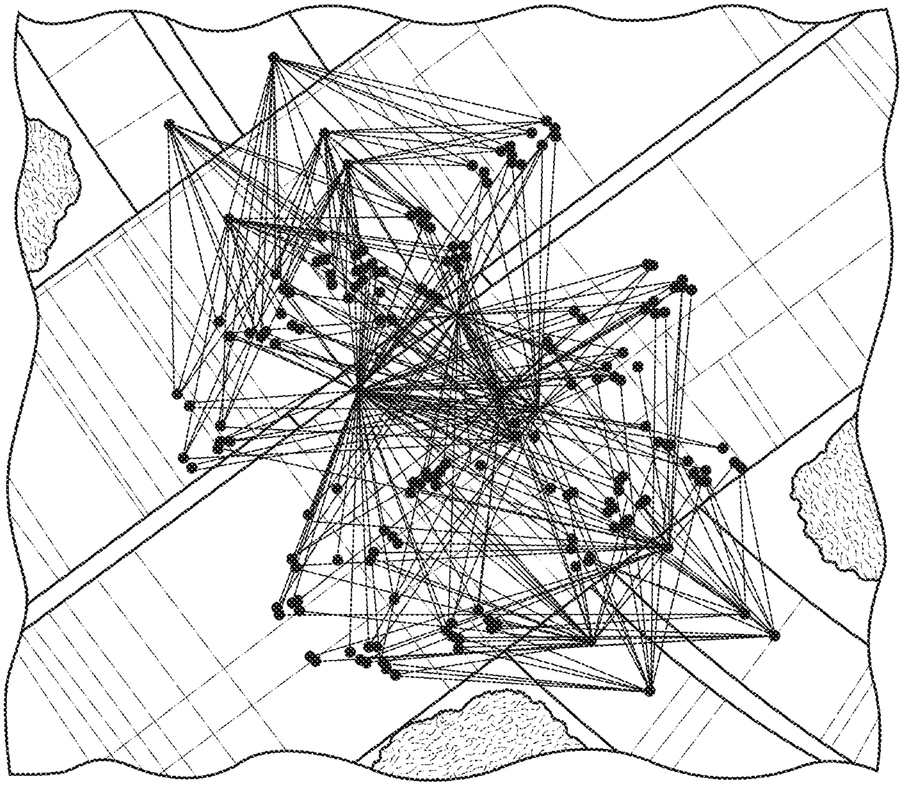
FIG. 10 illustrates a more complex example of the separation graph of FIG. 8.

The examples given in FIGS. 7 and 8 were simplified examples of a connection graph 600 and a separation graph 700. However, the same principles can be applied on a much larger scale. For example, FIG. 9 illustrates a much more complex connection graph, while FIG. 10 illustrates a much more complex separation graph.

Figure 11:
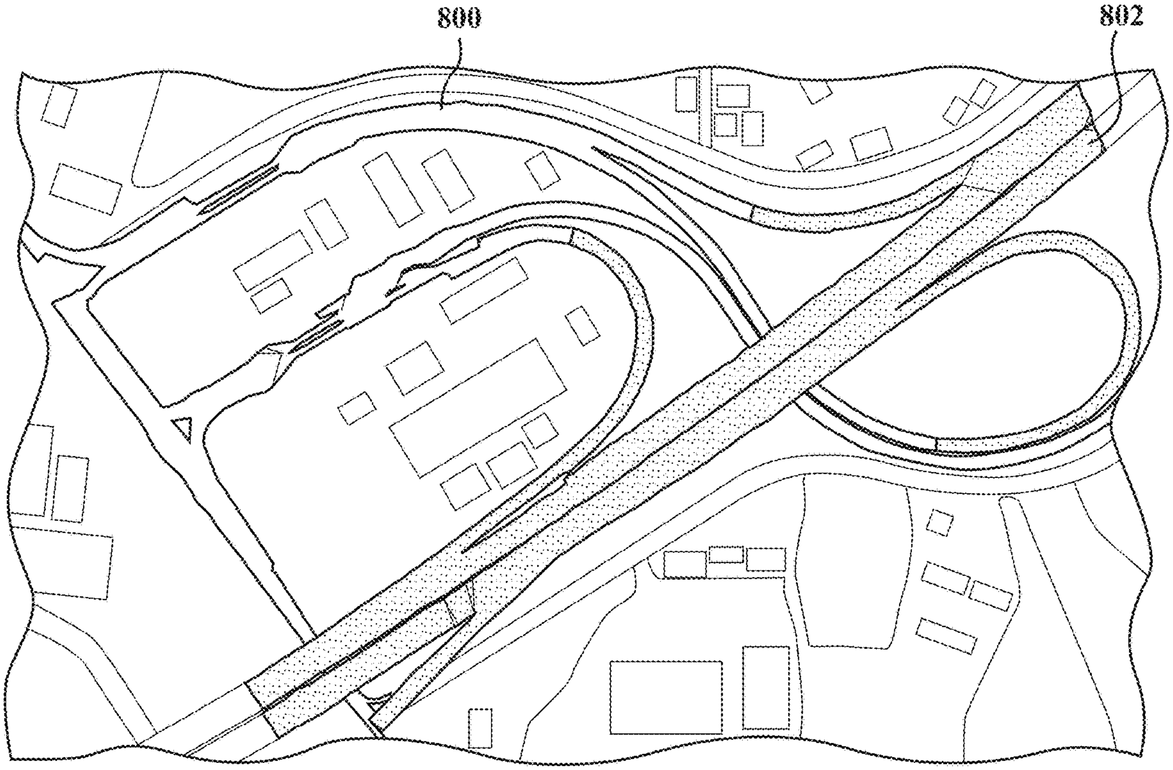
FIG. 11 illustrates an example of non-self-overlapping polygons generated using the connection graph and the separation graph.

As shown in FIG. 11, once the connection graph 600 and the separation graph 700 are generated, the instruction module 122 causes the processor(s) 110 to generate non-self-overlapping polygons 800 and 802 using the separation graph 700, the connection graph 600, and the drivable surface polygon(s) 132 previously described. Moreover, the instruction module 122 causes the processor(s) 110 to unify the drivable surface polygon(s) 132 that are part of the connection graph 600 but are not included in the separation graph 700 to form the non-self-overlapping polygons 800 and 802. As such, the non-self-overlapping polygons 800 and 802 are coherent driving surfaces.

Moreover, in one example, the method for growing the non-self-overlapping polygons 800 and 802 is iterative. In every iteration, the method includes finding a connection graph edge with the lowest absolute gradient of all connection graph edges that have not yet been processed and generating a combined graph. The combined graph is a graph that includes the nodes of the connection and separation graphs, as well as the undirected edges of a current layer graph and the directed edges of the separation graph. The layer graph includes centroids or nodes that are present in both the connection graph and the separation graph. The layer graph also includes a subset of the edges that are present in the connection graph. The connected components of the layer graph form the individual layers. A connected component in a graph is defined as the set of nodes that are reachable from each other. In other words, the layer graph is a connection graph that has some edges removed such that the connected components form layers. In particular, the layer graph is particularly useful because it provides a mapping from node to layer.

The method further includes checking whether adding the connection graph edge with the lowest absolute gradient of all connection graph edges that have not yet been processed to the combined graph creates a directed cycle in the combined graph that includes separation graph edges. In a case where the combined graph includes separation graph edges, one cannot add the current edge because we would create inconsistent layers. A cycle in the combined graph that includes separation graph edges is synonymous with inconsistent layers. For example, assume a cycle contains two separation graph edges. If such a cycle exists, that means that the method starts at a certain node, follows a couple of drivability edges, then goes up one layer by following a directed separation graph edge, again follows a couple of connection graph edges, and then up another layer along the second separation graph edge, just to arrive back at where it started. Going up two times to be back at the start is a clear indication of the layers being incorrect.

The method adds an edge only if the addition of this edge does not make the combination graph intertwined. The method includes marking the connection graph edge as processed and repeating the steps until all connection graph edges are processed.

Figure 12:
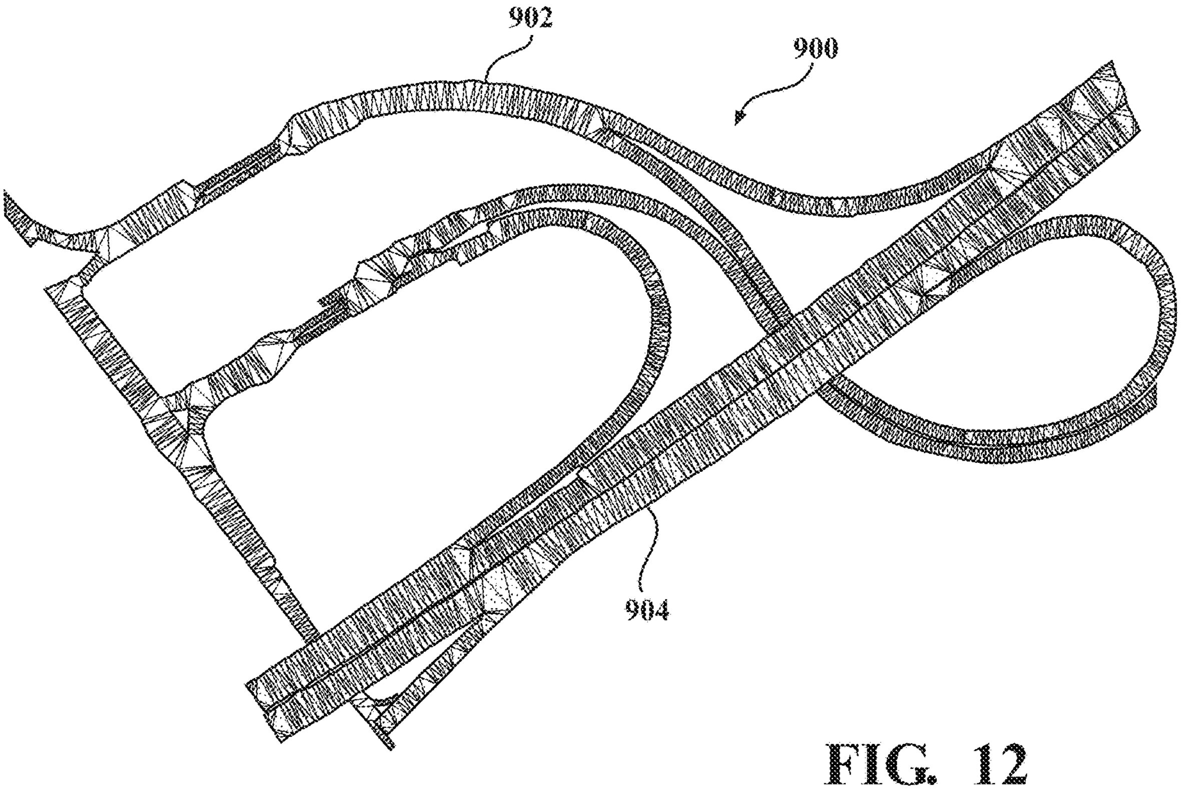
FIG. 12 illustrates an example of a three-dimensional mesh generated from the non-self-overlapping polygons of FIG. 11.

Once the non-self-overlapping polygons 800 and 802 are generated, the instruction module 122 causes the processor(s) 110 to perform a triangulation procedure on the non-self-overlapping polygons 800 and 802 to generate a three-dimensional mesh 900, shown in FIG. 12, which may be stored in the data store 130 as the three-dimensional mesh 135. Here, the three-dimensional mesh 900 includes one portion 902, which is the triangulation of the non-self-overlapping polygon 800, and another portion 904, which is the triangulation of the non-self-overlapping polygon 802. The triangulation procedure could be a constrained Delaunay triangulation process. In computational geometry, a constrained Delaunay triangulation of a planar straight-line graph subdivides the graph into triangles, ensuring that each graph segment is present as a single edge in the triangulation.

Figure 13A:
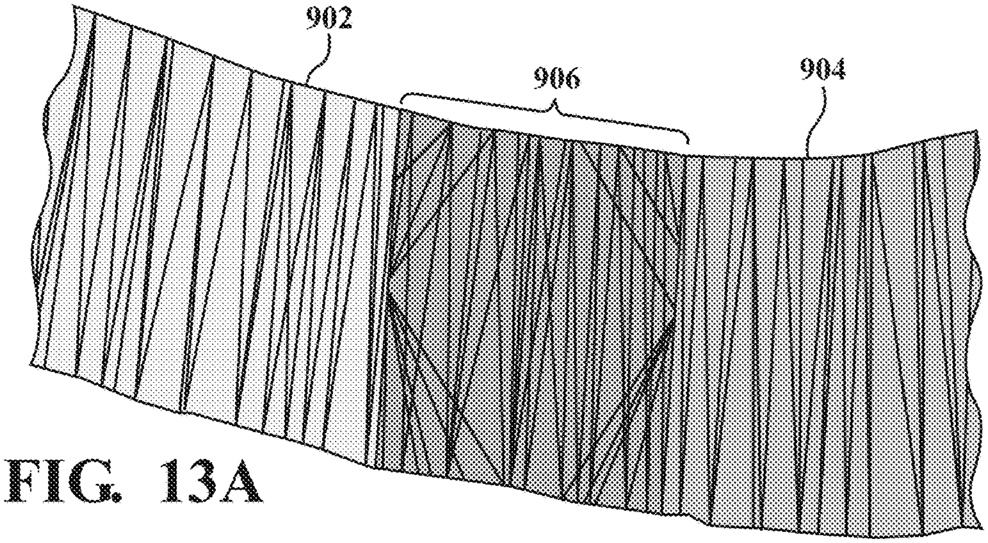
FIGS. 13A-13C illustrate the removal and replacement of overlapping triangles of the three-dimensional mesh.
Figure 13B:
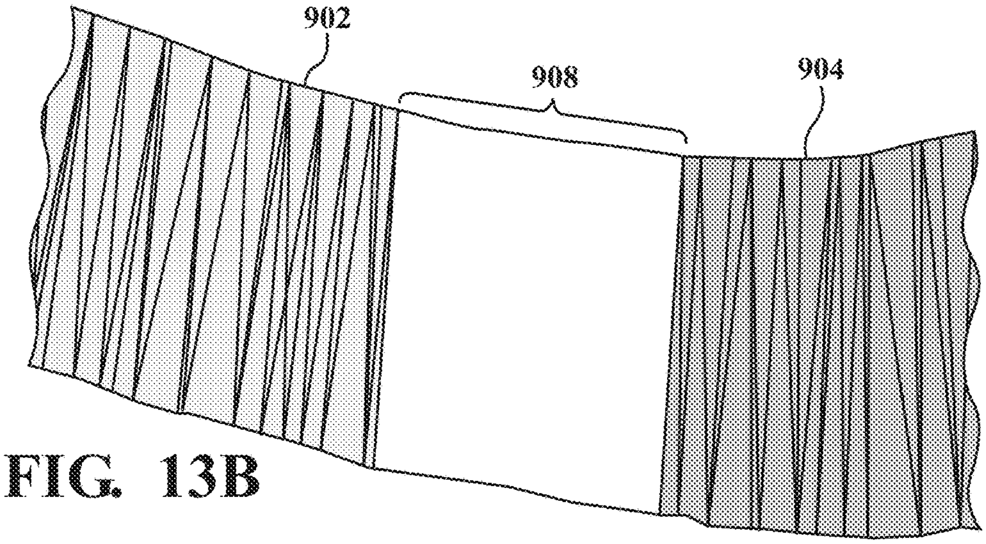
Figure 13C:
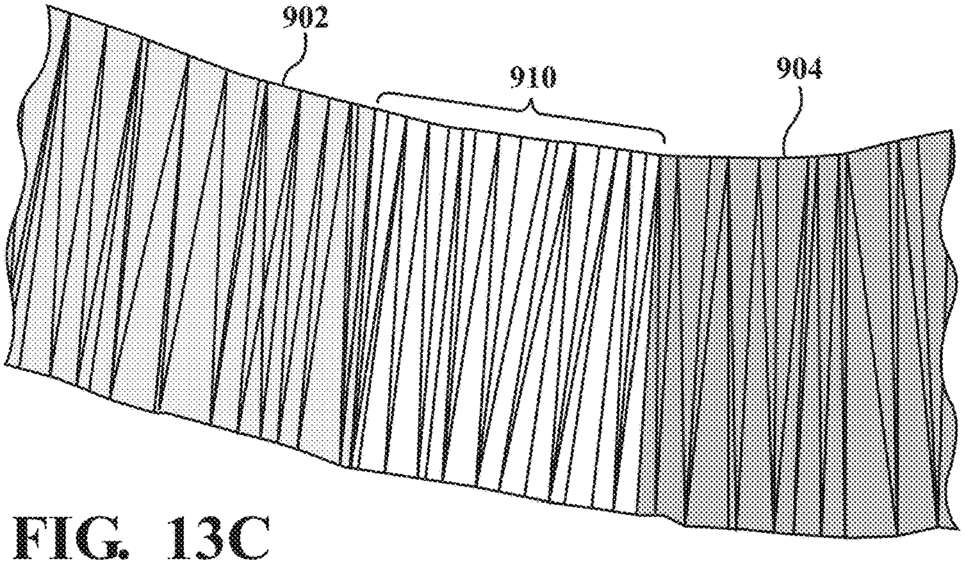

There may be overlapping triangles in areas where the portions 902 and 904 of the three-dimensional mesh 900 meet. For example, referring to FIG. 13A, illustrated is a section 906 and includes overlapping triangles from the portions 902 and 904. Here, the instruction module 122 causes the processor(s) 110 to identify the overlapping triangles of the section 906. This identification process may involve utilizing the connection graph 600 and the separation graph 700. Once identified, the instruction module 122 causes the processor(s) 110 to delete the overlapping triangles in the section 906, yielding a removed surface 908. After that, the instruction module 122 causes the processor(s) 110 to retriangulate the removed surface 908, resulting in a mesh 910 that connects the portions 902 and 904 of the three-dimensional mesh 900 without any overlapping triangles.

Figure 14:
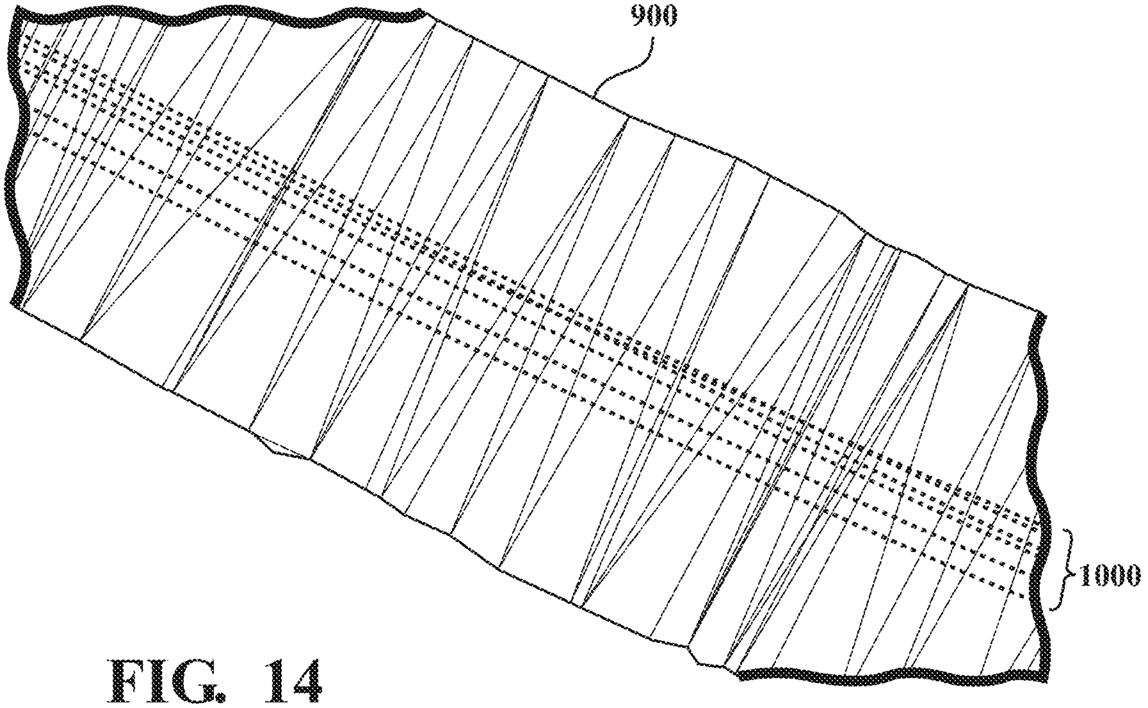
FIG. 14 illustrates the overlapping of vehicle traces onto the three-dimensional mesh to generate a road graph.

Once the three-dimensional mesh 900 is generated, the instruction module 122 causes the processor(s) 110 to generate road graphs using the three-dimensional mesh 900 and vehicle traces of vehicles that collected sensor information used to generate the three-dimensional mesh 900. Moreover, referring to FIG. 14, the instruction module 122 causes the processor(s) 110 to first overlay the vehicle traces 1000 onto the three-dimensional mesh 900. In the case of stacked roads, information associated with which triangle is retained. Otherwise, traces on one road might create road graph segments on another road. For example, associations such as which trace relates to which drivable surface polygon, which drivable surface polygon relates to which non-self-overlapping polygon, and which non-self-overlapping polygon relates to which triangle may be retained. As mentioned before, the vehicle traces 1000 are traces generated from vehicles, similar to the vehicle 200 of FIG. 1, that collected sensor information used to generate the key point detections.

Figure 15A:
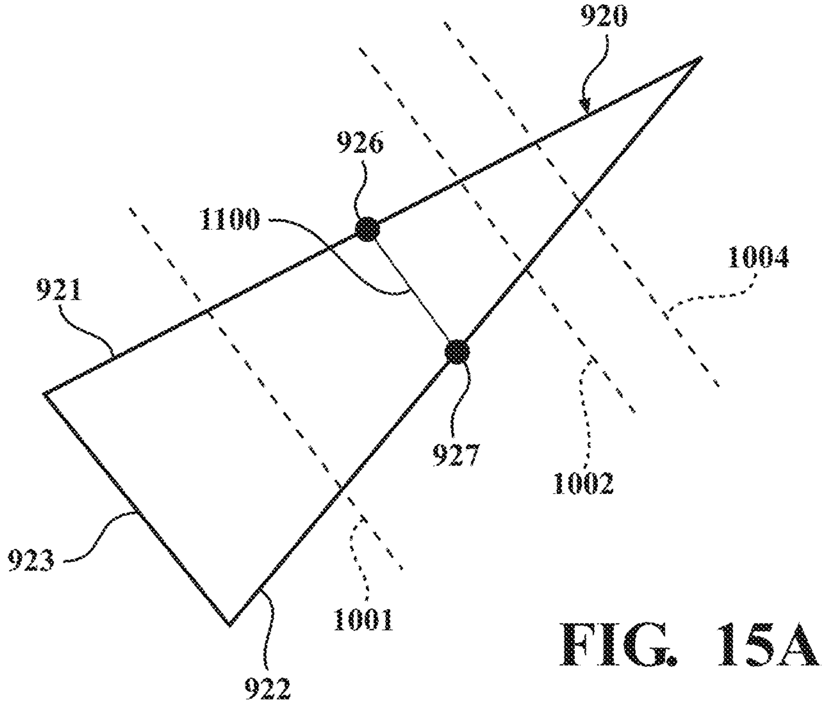
FIGS. 15A and 15B illustrate the plotting of road graphs by overlapping vehicle traces onto the three-dimensional mesh.

Next, the instruction module 122 causes the processor(s) 110 to evaluate each triangle of the three-dimensional mesh 900 to determine if one or more of the vehicle traces 1000 cross through at least two sides of a triangle, forming the three-dimensional mesh 900. For example, FIG. 15A illustrates a triangle 920 that is part of the three-dimensional mesh 900. Being a triangle, the triangle 920 has three sides 921-923. In this example, vehicle traces 1001, 1002, and

1004 have crossed the two sides 921 and 922 of the triangle 920. After determining that one or more vehicle traces 1000 have crossed at least two sides of the triangle 920, the instruction module 122 causes the processor(s) 110 to determine the midpoints of each of the sides 921 and 922 that were crossed by the vehicle traces 1001, 1002, and 1004. In this example, the midpoint of the side 921 is point 926, while the midpoint of the side 922 is point 927. After that, the instruction module 122 causes the processor(s) 110 to plot a road graph 1100 from the point 926 to the point 927. The road graph 1100 may be stored in the data store 130 as the road graph(s) 136.

Figure 15B:
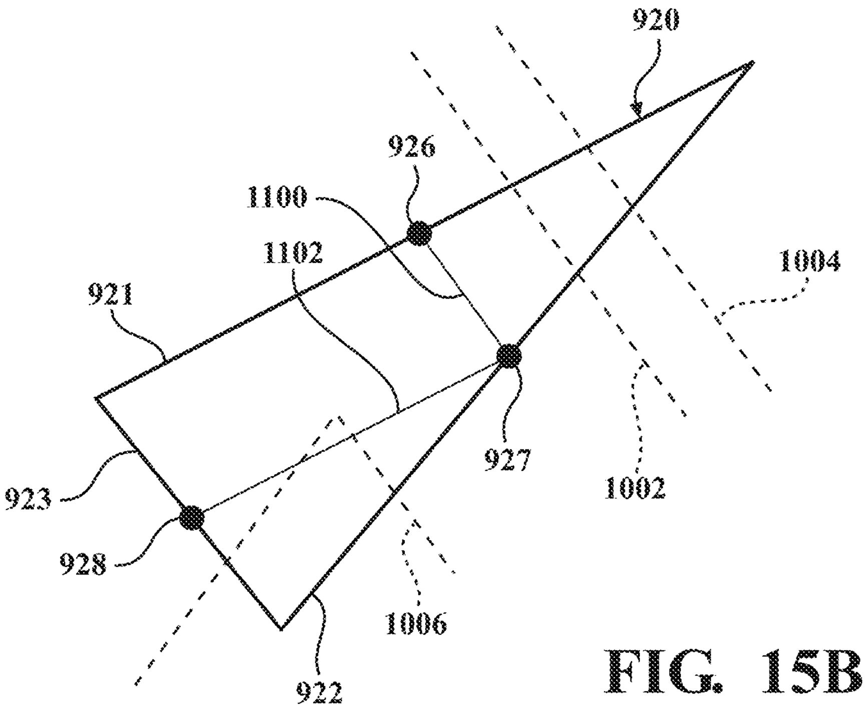

Of course, it should be understood that there may be situations in which vehicle traces may cross through different sides of a triangle. FIG. 15B illustrates an example wherein a vehicle trace 1006 crosses the sides 922 and 923 of the triangle 920, and vehicle traces 1002 and 1004 cross the sides 921 and 922 of the triangle 920. When this occurs, two different road graph segments are plotted. Moreover, the instruction module 122 causes the processor(s) 110 to plot a road graph 1100 from the point 926 to the point 927 and to plot a road graph 1102 from the point 927 to the point 928.

Figure 16:
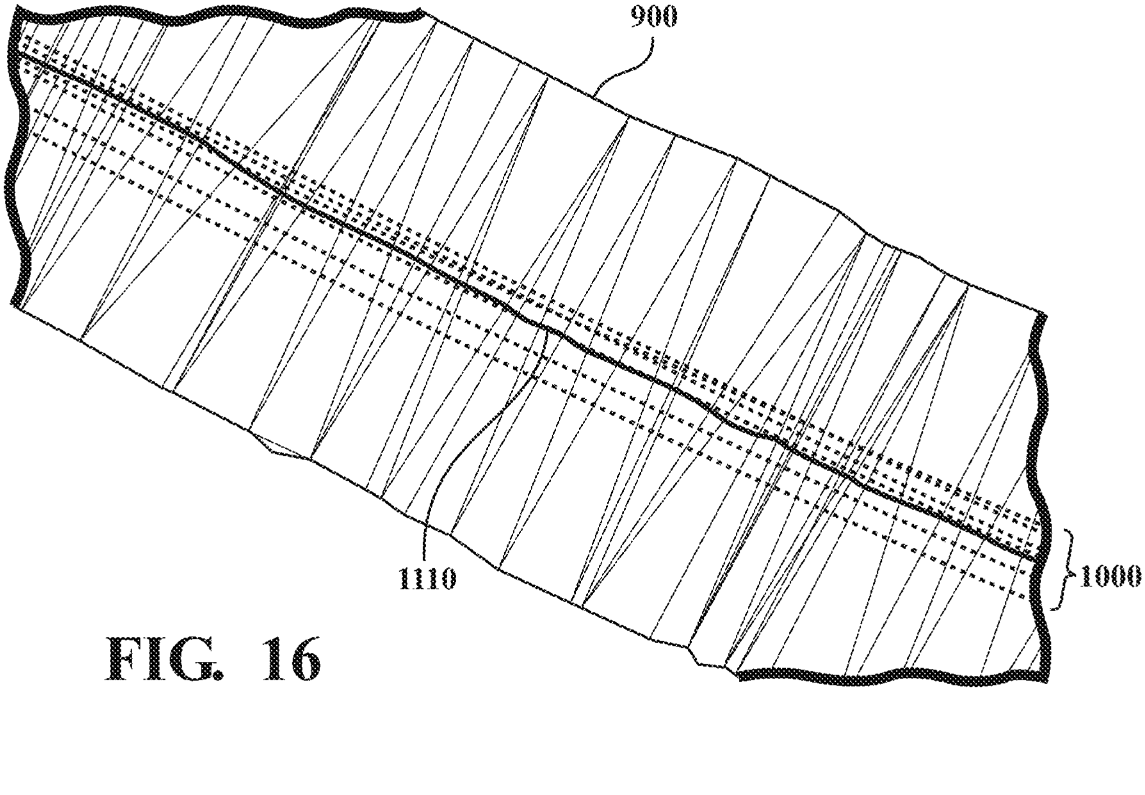
FIG. 16 illustrates an example of a constructed road graph.
Figure 17:
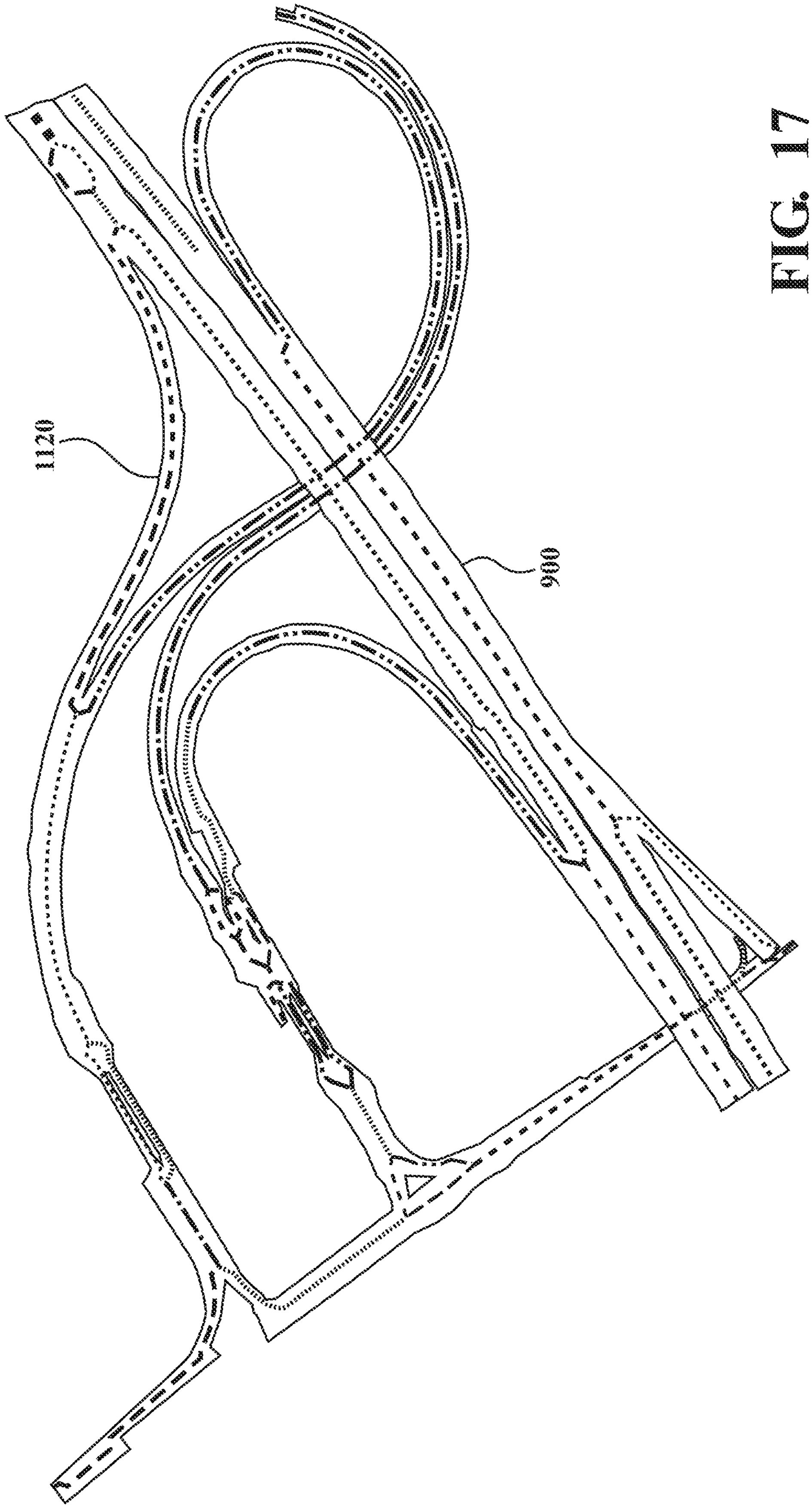
FIG. 17 illustrates a larger and more complex example of constructed road graphs.

This plotting of the road graph continues iteratively throughout the three-dimensional mesh 900. For example, FIG. 16 illustrates an example of a portion of the three-dimensional mesh 900 having a road graph 1110 based on the methodologies described in the prior paragraphs. FIG. 17 illustrates a much larger road graph 1120 plotted across a much larger portion of the three-dimensional mesh 900.

Figure 18A:
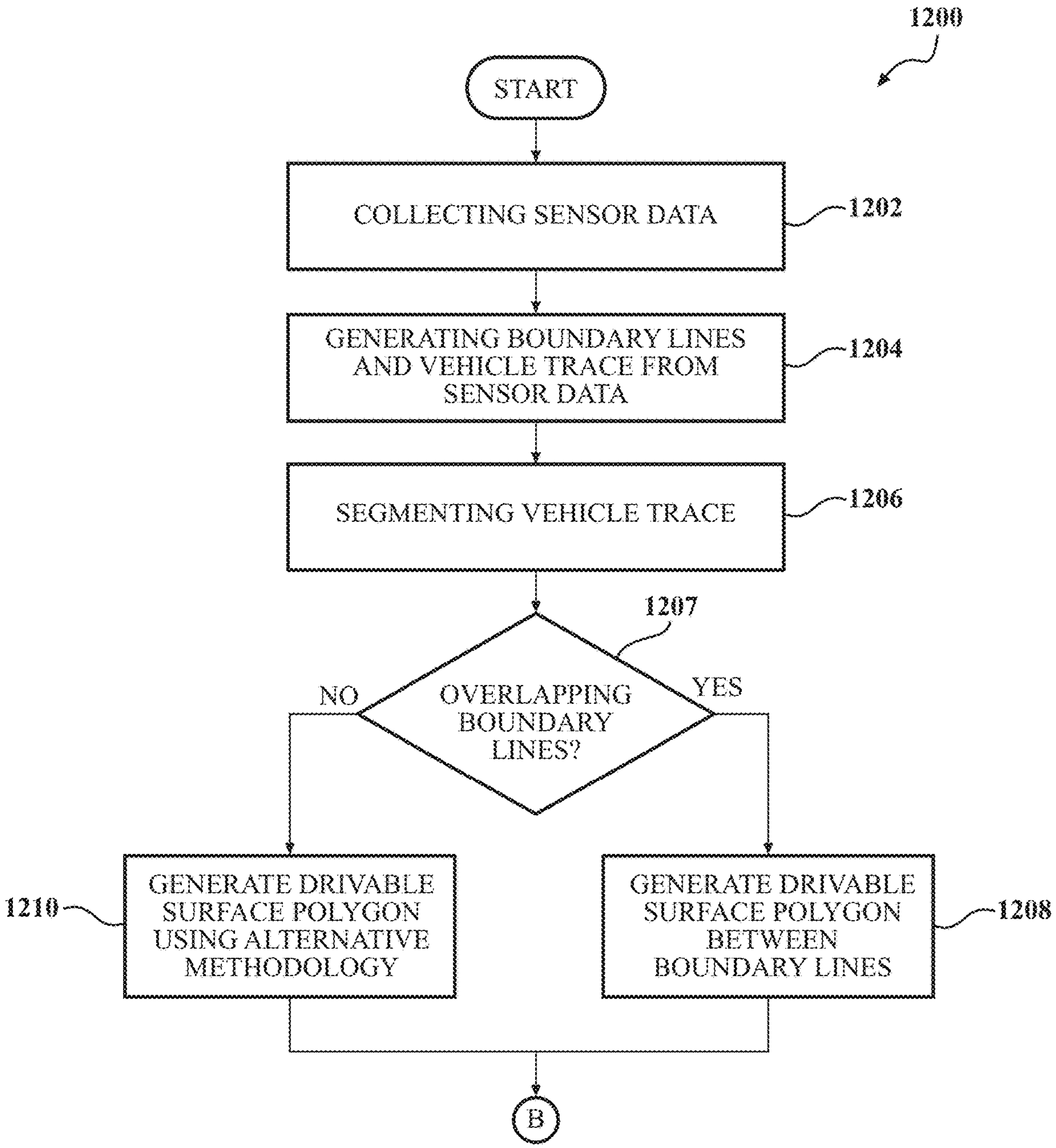
FIGS. 18A-18C illustrate a method for constructing three-dimensional meshes and utilizing the three-dimensional meshes to generate road graphs.
Figure 18B:
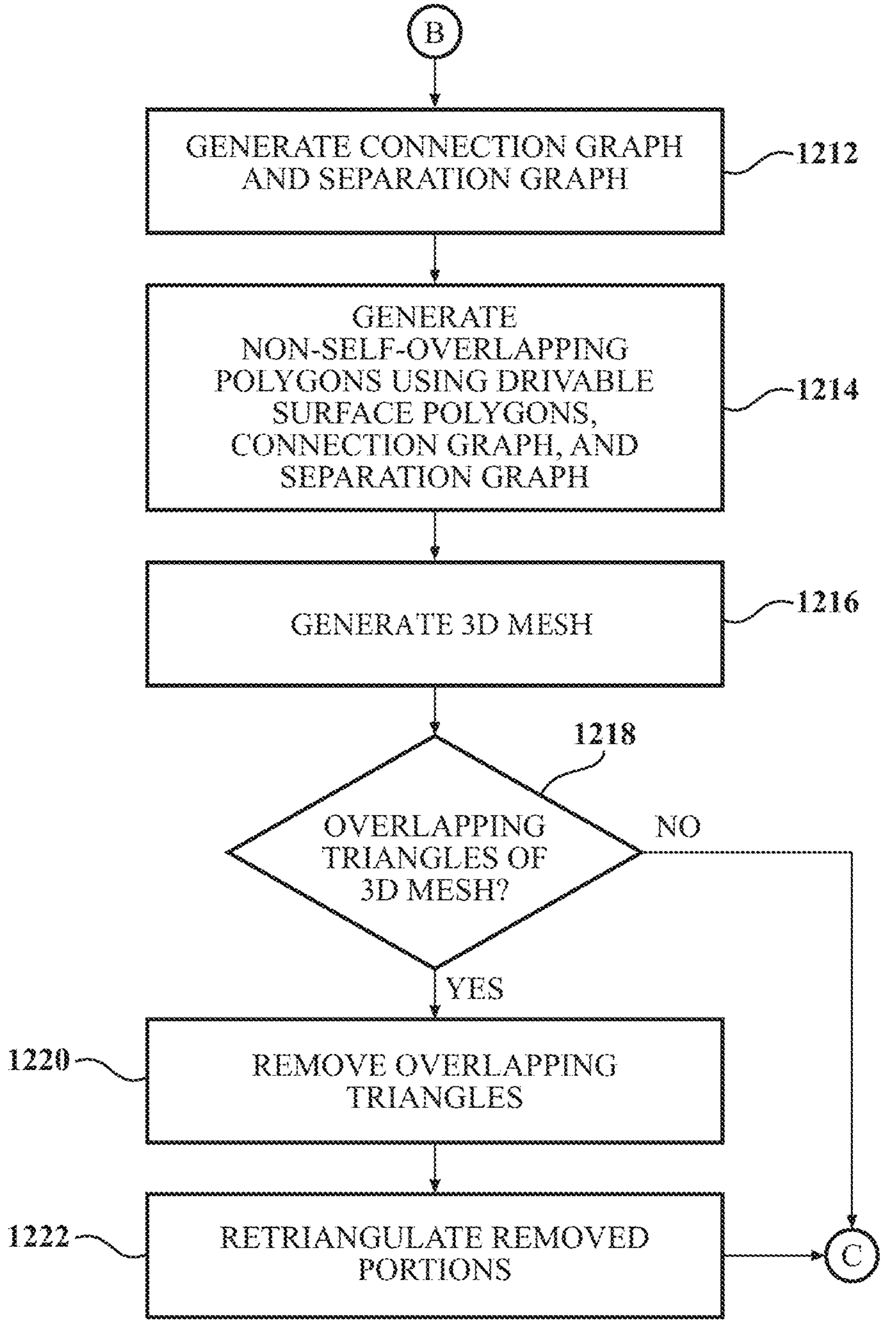
Figure 18C:
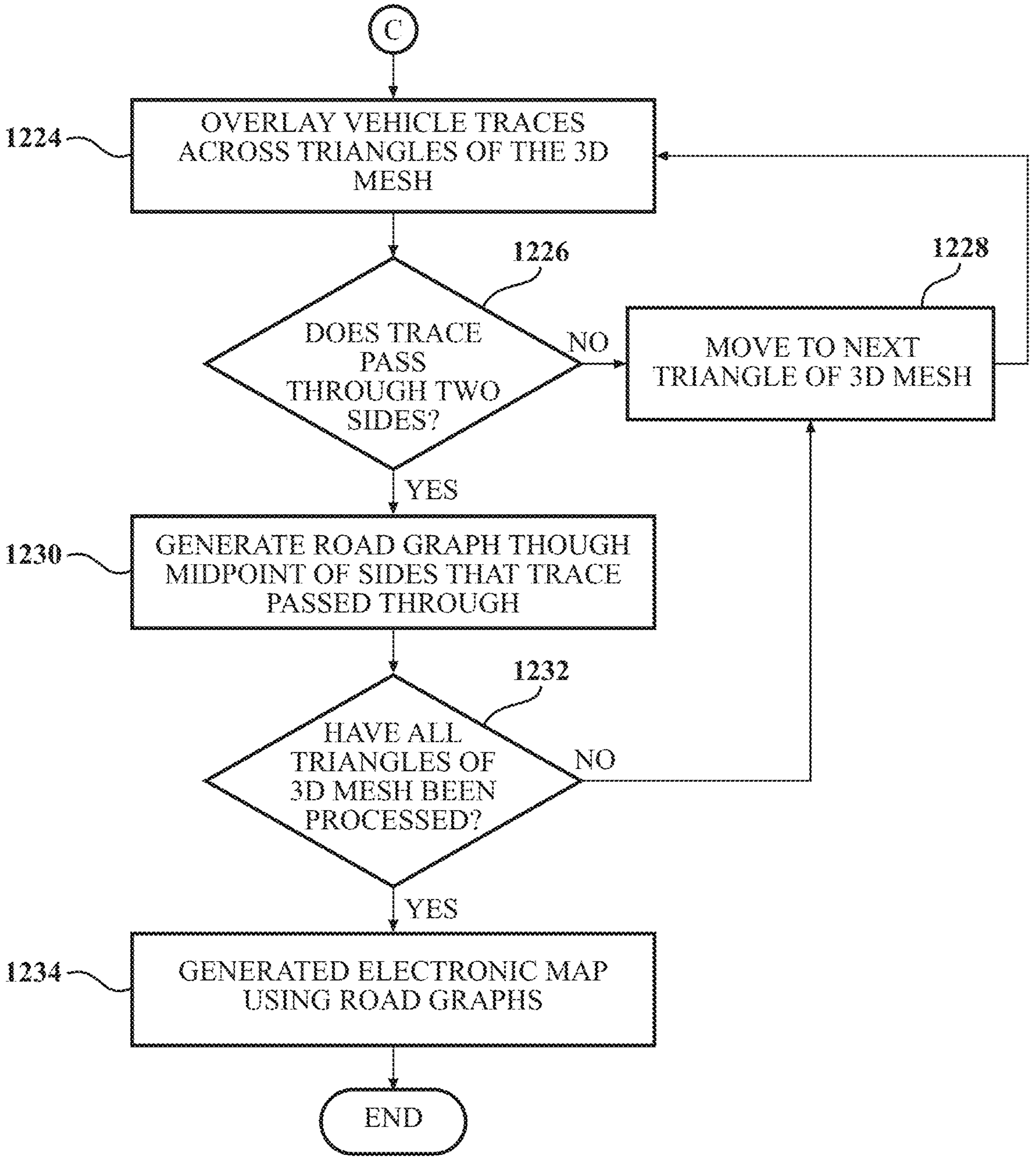

Referring to FIGS. 18A-18C, a method 1200 is shown for generating a three-dimensional mesh of a road network and road graphs. The method 1200 will be described from the viewpoint of the system 100 in FIG. 1. However, it should be understood that this is just one example of implementing the method 1200. While method 1200 is discussed in combination with the system 100, it should be appreciated that the method 1200 is not limited to being implemented within the system 100, but is instead one example of a system that may implement the method 1200.

In step 1202, the instruction module 122 causes the processor(s) 110 to collect sensor data 131 from one or more vehicles, such as the vehicle 200. As mentioned before, the vehicle 200 has a sensor system that can collect information related to lane boundaries as well as vehicle trajectory information. As such, the sensor data 131 may include information that can be utilized to generate key point detections and vehicle traces.

In step 1204, the instruction module 122 causes the processor(s) 110 to determine boundary lines using key point detections from the sensor data 131. The key point detections can be used to generate boundaries by connecting the key point detections.

In step 1206, the instruction module 122 causes the processor(s) 110 to segment the vehicle trace into multiple segments. As mentioned before, the vehicle trace may be segmented by a fixed distance d. The fixed distance d may be approximately 25 meters, but any suitable distance can be utilized.

In step 1207, the instruction module 122 causes the processor(s) 110 to determine if there are boundary lines whose projections onto the trace line overlap for each segment of the trace. If the boundary line projections do overlap for a particular segment of a trace, the method proceeds to step 1208, wherein the instruction module 122 causes the processor(s) 110 to generate drivable surface polygon(s) 132 having a length dictated by the fixed distance d and a width generally extending between the outermost boundary lines.

However, if boundary lines do not overlap for a particular segment of a trace, the method 1200 proceeds to step 1210, wherein the instruction module 122 causes the processor(s) 110 to utilize an alternative methodology to generate drivable surface polygon(s) 132. As described before, this alternative methodology can involve generating a drivable surface polygon that extends from the trace to the detected boundary and also extends from the trace away from the detected boundary for a distance that is approximately half the width of a vehicle. Another alternative methodology can involve generating a drivable surface polygon that extends from the trace to the detected boundary and also extends from the trace away from the detected boundary for the distance that is the maximum sensing distance of a boundary-detecting sensor.

Once the steps 1208 or 1210 have been executed, the method 1200 proceeds to step 1212, wherein the instruction module 122 causes the processor(s) 110 to generate the connection graph 133 and the separation graph 134. The connection graph 133 and the separation graph 134 may be generated as part of the same process. The steps of this process are essentially: iterate over all pairs of overlapping polygons, (b) for each pair, determine if they are directly accessible to each other, and (c) if they are, add them to the connection graph 133 as an edge or, if they are not, add them to the separation graph 134 as an edge.

Moreover, as to the connection graph 133, the instruction module 122 causes the processor(s) 110 to identify overlapping polygons and determine if they are accessible to one another by determining a difference in altitudes between the overlapping polygons. If the altitude difference is below a threshold, the overlapping polygons become part of the connection graph 133, indicating that they are accessible to one another. As mentioned before, other additional determinations can also be utilized, such as if the overlapping polygons were generated by the same vehicle, the percentage overlap of the overlapping polygons, etc. Of course, other ways to generate the connection graph 133 and the separation graph 134 can be considered. For example, if the altitude difference was below a threshold and the intersection over a union of the polygons was above a threshold or if two polygons were generated by the same vehicle in succession, an edge would be added to the connection graph. Instead of using heuristics like these, method 1200 could also employ a learned model or other method.

As to the separation graph 134, the instruction module 122 causes the processor(s) 110 to identify overlapping polygons and determine if they are not accessible to one another by determining a difference in altitudes between the overlapping polygons. If the altitude difference is above a threshold, the overlapping polygons become part of the separation graph 134, indicating they are not accessible to one another.

In step 1214, the instruction module 122 causes the processor(s) 110 to generate non-self-overlapping polygons using the drivable surface polygon(s) 132, the connection graph 133, and the separation graph 134. Moreover, the instruction module 122 causes the processor(s) 110 to unify the drivable surface polygon(s) 132 that are part of the connection graph 133 but are not included in the separation graph 134 to form the non-self-overlapping polygons.

In step 1216, the instruction module 122 causes the processor(s) 110 to perform a triangulation procedure on the non-self-overlapping polygons to generate a three-dimensional mesh 135. As mentioned before, the triangulation procedure could be a Delaunay triangulation process.

In step 1218, the instruction module 122 causes the processor(s) 110 to determine for every pair of non-self-overlapping polygons if the corresponding portions of the three-dimensional mesh 135 includes any overlapping triangles that are associated with drivable surface polygons that are directly accessible to each other according to the connection graph. If overlapping triangles are detected, the method 1200 proceeds to step 1220, wherein the instruction module 122 causes the processor(s) to delete the overlapping triangles in sections of the three-dimensional mesh 135, yielding one or more removed surfaces. After that, in step 1222, the instruction module 122 causes the processor(s) to retriangulate the removed surfaces.

Once any overlapping triangles have been removed (except where roads may be stacked), the method 1200 proceeds to step 1224, wherein the instruction module 122 causes the processor(s) 110 to overlay vehicle traces onto the three-dimensional mesh 135. As shown in step 1226, for each triangle of the three-dimensional mesh 135, the instruction module 122 causes the processor(s) to determine if at least one vehicle trace passes through two sides of a triangle. If a particular triangle does not have a trace passing through at least two sides, the method 1200 proceeds to step 1228 and moves to the next triangle. Otherwise, the method 1200 proceeds to step 1230.

In step 1230, the instruction module 122 causes the processor(s) 110 to generate a road graph(s) 136 through the midpoint of the sides of the triangle that the trace passes through. Once plotted, the method proceeds to step 1232, wherein the instruction module 122 causes the processor(s) 110 to determine if all the triangles of the three-dimensional mesh 135 have been processed. If not, the method 1200 proceeds to step 1228 and moves to the next triangle of the three-dimensional mesh 135. Otherwise, the method 1200 proceeds to step 1234, wherein the instruction module 122 causes the processor(s) 110 to generate an electronic map 137 using the road graph(s) 136. It should be noted that the generation of an electronic map 137 can not only include the initial creation of the electronic map 137 but can also include the updating of the electronic map 137. After that, the method 1200 ends.

As such, the systems and methods described herein can start with key point detections and vehicle trace information and ultimately generate road graphs based on this information by creating a three-dimensional mesh as an intermediate step. This methodology results in more accurate road graphs that are less burdensome to generate.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the preceding. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the preceding. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the preceding. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the preceding specification, as indicating the scope hereof.

What is claimed is:

1. A system comprising:

a processor;

a memory having an instruction module including instructions that, when executed by the processor, cause the processor to:

generate a three-dimensional mesh representing road surfaces of a road using a connection graph, a separation graph, and drivable surface polygons representing drivable surfaces of the road, the connection graph indicates which overlapping polygons of the drivable surface polygons represent the road surfaces that are accessible to each other and the separation graph indicates which of the overlapping polygons of the drivable surface polygons represent the road surfaces that are not accessible to each other; and generate a road graph for an electronic map based on the three-dimensional mesh, the road graph being a digital representation of a topology of a road network, wherein an autonomous driving system of a vehicle performs autonomous driving using the electronic map at least partially disposed of in one or more systems of the vehicle.

2. The system of claim 1, wherein the instruction module further includes instructions that, when executed by the processor, cause the processor to:

identify overlapping polygons of the drivable surface polygons that have altitude differences that are below a threshold difference; and include the overlapping polygons that are below the threshold difference in altitude and that overlap by more than a threshold amount.

3. The system of claim 2, wherein the instruction module further includes instructions that, when executed by the processor, cause the processor to:

in response to a determination that the overlapping polygons were generated based on sensor data collected from a same vehicle, connect the overlapping polygons.

4. The system of claim 1, wherein the instruction module further includes instructions that, when executed by the processor, cause the processor to:

identify overlapping polygons of the drivable surface polygons that have altitude differences that are above a threshold difference; and include the overlapping polygons that are above the threshold difference in the separation graph.

5. The system of claim 1, wherein the instruction module further includes instructions that, when executed by the processor, cause the processor to:

determine non-self-overlapping polygons using the connection graph, the separation graph, and the drivable surface polygons; and triangulate the non-self-overlapping polygons to generate the three-dimensional mesh.

6. The system of claim 5, wherein the instruction module further includes instructions that, when executed by the processor, cause the processor to:

determine overlapping triangles of the three-dimensional mesh that overlap one another;

for each pair of adjacent non-self-overlapping polygons, remove the overlapping triangles that are associated with drivable surface polygons that are connected according to the connection graph to generate a removed surface; and retriangulate the removed surface of the three-dimensional mesh.

7. The system of claim 5, wherein the instruction module further includes instructions that, when executed by the processor, cause the processor to:

overlap traces of vehicles that collected information used to generate the three-dimensional mesh onto corresponding triangles forming the three-dimensional mesh; and plot the road graph through midpoints of sides of triangles of the corresponding triangles that were crossed by traces.

8. A method comprising:

generating a three-dimensional mesh representing road surfaces of a road using a connection graph, a separation graph, and drivable surface polygons representing drivable surfaces of the road, the connection graph indicates which overlapping polygons of the drivable surface polygons represent the road surfaces that are accessible to each other and the separation graph indicates which of the overlapping polygons of the drivable surface polygons represent the road surfaces that are not accessible to each other;

generating a road graph for an electronic map based on the three-dimensional mesh, the road graph being a digital representation of a topology of a road network; and performing autonomous driving of a vehicle using the electronic map.

9. The method of claim 8, wherein the connection graph is generated by:

identifying overlapping polygons of the drivable surface polygons that have altitude differences that are below a threshold difference; and including the overlapping polygons that are below the threshold difference in altitude and that overlap by more than a threshold amount.

10. The method of claim 9, further comprising:

in response to a determination that the overlapping polygons were generated based on sensor data collected from a same vehicle, connecting the overlapping polygons.

11. The method of claim 8, wherein the separation graph is generated by:

identifying overlapping polygons of the drivable surface polygons that have altitude differences that are above a threshold difference; and including the overlapping polygons that are above the threshold difference in the separation graph.

12. The method of claim 8, wherein the three-dimensional mesh is generated by:

determining non-self-overlapping polygons using the connection graph, the separation graph, and the drivable surface polygons; and triangulating the non-self-overlapping polygons to generate the three-dimensional mesh.

13. The method of claim 12, further comprising:

determining overlapping triangles of the three-dimensional mesh that overlap one another;

for each pair of adjacent non-self-overlapping polygons, removing the overlapping triangles that are associated with drivable surface polygons that are connected according to the connection graph to generate a removed surface; and retriangulating the removed surface of the three-dimensional mesh.

14. The method of claim 12, further comprising:

overlapping traces of vehicles that collected information used to generate the three-dimensional mesh onto corresponding triangles forming the three-dimensional mesh; and plotting the road graph through midpoints of sides of triangles of the corresponding triangles that were crossed by traces.

15. A non-transitory computer-readable medium including instructions that, when executed by a processor, cause the processor to:

generate a three-dimensional mesh representing road surfaces of a road using a connection graph, a separation graph, and drivable surface polygons representing drivable surfaces of the road, the connection graph indicates which overlapping polygons of the drivable surface polygons represent the road surfaces that are accessible to each other and the separation graph indicates which of the overlapping polygons of the drivable surface polygons represent the road surfaces that are not accessible to each other, and generate a road graph for an electronic map based on the three-dimensional mesh, the road graph being a digital representation of a topology of a road network, the electronic map being at least partially disposed of in one or more systems of a vehicle, wherein an autonomous driving system of the vehicle performs autonomous driving using the electronic map.

* * * * *